(12) United States Patent
Zhang et al.

(10) Patent No.: US 12,192,965 B2
(45) Date of Patent: Jan. 7, 2025

(54) OVER-THE-AIR SIGNALING FOR INTER-BASE STATION CROSS LINK INTERFERENCE MEASUREMENTS

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Tao Luo, San Diego, CA (US); Junyi Li, Fairless Hills, PA (US); Huilin Xu, Temecula, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 17/681,577

(22) Filed: Feb. 25, 2022

(65) Prior Publication Data
US 2023/0309062 A1 Sep. 28, 2023

(51) Int. Cl.
*H04W 4/00* (2018.01)
*H04W 24/08* (2009.01)
(Continued)

(52) U.S. Cl.
CPC .......... *H04W 72/02* (2013.01); *H04W 24/08* (2013.01); *H04W 72/0446* (2013.01);
(Continued)

(58) Field of Classification Search
CPC ... H04W 72/02; H04W 24/08; H04W 72/046; H04W 72/1263; H04W 72/541;
(Continued)

(56) References Cited

U.S. PATENT DOCUMENTS

2019/0044631 A1\* 2/2019 Davydov .............. H04W 24/08
2019/0190582 A1\* 6/2019 Guo ..................... H04W 72/046
(Continued)

FOREIGN PATENT DOCUMENTS

CA          3112638 A1 \*  3/2020 .............. G01S 5/00
WO     WO-2020146331 A1   7/2020
(Continued)

OTHER PUBLICATIONS

International Search Report and Written Opinion—PCT/US2023/061305—ISA/EPO—Apr. 6, 2023 (2200605WO).
LG Electronics: "Summary of Issues on UE-UE CLI Measurements and Network Coordination Mechanism", 3GPP TSG RAN WG1 Meeting #96, R1-1903452, 3rd Generation Partnership Project, Mobile Competence Centre, 650, Route Des Lucioles, F-06921 Sophia-Antipolis Cedex, France, vol. RAN WG1, No. Athens, Greece, Feb. 12, 2019-Feb. 16, 2019, Feb. 27, 2019, XP051601123, 28 pages.

*Primary Examiner* — Phuongchau Ba Nguyen
(74) *Attorney, Agent, or Firm* — Holland & Hart LLP

(57) ABSTRACT

Methods, systems, and devices for wireless communications are described. A network entity, such as a base station, may receive, from a first network entity, a broadcast indicating a downlink control channel transmission pattern associated with the first network entity. The network entity may monitor a plurality of receive beams for a plurality of downlink control channel transmissions from the first network entity according to the downlink control channel transmission pattern and may select a communication beam according to one or more cross-link interference (CLI) measurements associated with one or more of the plurality of receive beams in accordance with the monitoring. The network entity may communicate with a user equipment using the selected communication beam and a first set of resources that at least partially overlap in time and frequency with a scheduled communication at the first network entity. The network entity may experience or may cause the measured CLI.

24 Claims, 14 Drawing Sheets

(51) Int. Cl.
  *H04W 72/02*     (2009.01)
  *H04W 72/044*    (2023.01)
  *H04W 72/0446*   (2023.01)
  *H04W 72/0453*   (2023.01)
  *H04W 72/1263*   (2023.01)
  *H04W 72/541*    (2023.01)

(52) U.S. Cl.
  CPC ..... *H04W 72/0453* (2013.01); *H04W 72/046* (2013.01); *H04W 72/1263* (2013.01); *H04W 72/541* (2023.01)

(58) Field of Classification Search
  CPC ..... H04W 24/10; H04W 28/04; H04W 72/04; H04W 72/042; H04W 88/08; H04W 28/08; H04W 28/084; H04W 36/22; H04W 72/12; H04B 7/088; H04L 5/0023; H04L 5/0053; H04L 5/006; H04L 5/0007
  See application file for complete search history.

(56) References Cited

U.S. PATENT DOCUMENTS

| | | | |
|---|---|---|---|
| 2021/0289374 A1* | 9/2021 | Zhang | H04W 24/08 |
| 2023/0081802 A1* | 3/2023 | Stirling-Gallacher | H04B 7/0695 375/260 |
| 2023/0113873 A1* | 4/2023 | Ibrahim | H04W 24/08 370/329 |
| 2023/0344497 A1* | 10/2023 | Wang | H04L 5/0023 |

FOREIGN PATENT DOCUMENTS

| | | | | |
|---|---|---|---|---|
| WO | WO-2021226620 A1 | 11/2021 | | |
| WO | WO-2021248397 A1 | 12/2021 | | |
| WO | WO-2023205077 A1 * | 10/2023 | ............ | H04W 24/08 |
| WO | WO-2024102627 A1 * | 5/2024 | ............ | H04B 7/0695 |

* cited by examiner

OVER-THE-AIR SIGNALING FOR INTER-BASE STATION CROSS LINK INTERFERENCE MEASUREMENTS

FIELD OF TECHNOLOGY

The following relates to wireless communications, including over-the-air (OTA) signaling for inter-base station cross link interference (CLI) measurements.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support over-the-air (OTA) signaling for inter-base station cross link interference (CLI) measurements. Generally, the described techniques provide for mitigating the effects of CLI at a victim base station.

For example, a first base station (e.g., a victim base station experiencing CLI) and a second base station (e.g., an aggressor base station causing CLI) may coordinate to measure CLI and mitigate the associated affects caused by operations in the full-duplex mode or by misaligned communication schedules. A receiving base station (e.g., victim or aggressor) may receive a broadcast communication indicating a downlink control channel repetition pattern where each repetition may be used as a reference signal for measuring CLI by the receiving base station. The transmitting base station may transmit a number of downlink control channel repetitions using a number of transmit beams and the receiving base station may monitor, according to the repetition pattern, for the repetitions using a number of receive beams. The receiving base station may measure an interference level for each transmit/receive beam combination (e.g., pairing) and may select a beam based on the measurements for communicating via a set of communication resources that at least partially overlaps with a set of communication resources of scheduled communications at the transmitting base station. As such the receiving entity may mitigate interference caused by full-duplex (FD) communications or misaligned communication schedules at a victim base station.

A method for wireless communication is described. The method may include receiving, from a first network entity, a broadcast indicating a downlink control channel transmission pattern associated with the first network entity, monitoring a set of multiple receive beams at a second network entity for a set of multiple downlink control channel transmissions from the first network entity according to the downlink control channel transmission pattern, selecting a communication beam according to one or more cross-link interference measurements associated with one or more of the set of multiple receive beams in accordance with the monitoring, and communicating with a user equipment (UE) using the selected communication beam and a first set of resources that at least partially overlap in time and frequency with a scheduled communication at the first network entity.

An apparatus for wireless communication is described. The apparatus may include at least one processor, and memory coupled (e.g., operatively, communicatively, functionally, electronically, or electrically) with the at least one processor, the memory storing instructions executable by the at least one processor to cause the apparatus to executable by the processor to cause the apparatus to receive, from a first network entity, a broadcast indicating a downlink control channel transmission pattern associated with the first network entity, monitor a set of multiple receive beams at a second network entity for a set of multiple downlink control channel transmissions from the first network entity according to the downlink control channel transmission pattern, select a communication beam according to one or more cross-link interference measurements associated with one or more of the set of multiple receive beams in accordance with the monitoring, and communicate with a UE using the selected communication beam and a first set of resources that at least partially overlap in time and frequency with a scheduled communication at the first network entity.

Another apparatus for wireless communication is described. The apparatus may include means for receiving, from a first network entity, a broadcast indicating a downlink control channel transmission pattern associated with the first network entity, means for monitoring a set of multiple receive beams at a second network entity for a set of multiple downlink control channel transmissions from the first network entity according to the downlink control channel transmission pattern, means for selecting a communication beam according to one or more cross-link interference measurements associated with one or more of the set of multiple receive beams in accordance with the monitoring, and means for communicating with a UE using the selected communication beam and a first set of resources that at least partially overlap in time and frequency with a scheduled communication at the first network entity.

A non-transitory computer-readable medium storing code for wireless communication is described. The code may include instructions executable by a processor to receive, from a first network entity, a broadcast indicating a downlink control channel transmission pattern associated with the first network entity, monitor a set of multiple receive beams at a second network entity for a set of multiple downlink control channel transmissions from the first network entity according to the downlink control channel transmission pattern, select a communication beam according to one or more cross-link interference measurements associated with one or more of the set of multiple receive beams in accordance with the monitoring, and communicate with a UE using the selected communication beam and a first set of resources that at least partially overlap in time and frequency with a scheduled communication at the first network entity.

In some examples of the method, apparatuses, and non-transitory computer-readable medium described herein, the communication beam includes a transmit beam and communicating with the UE may include operations, features, means, or instructions for performing a downlink transmission from the second network entity to the UE using the selected transmit beam, where the scheduled communication at the first network entity includes an uplink transmission to the first network entity scheduled by the set of multiple downlink control channel transmissions.

In some examples of the method, apparatuses, and non-transitory computer-readable medium described herein, the communication beam includes a receive beam and communicating with the UE may include operations, features, means, or instructions for receiving an uplink communication from the UE using the selected receive beam, where the scheduled communication at the first network entity includes a downlink transmission from the first network entity scheduled by the set of multiple downlink control channel transmissions.

Some examples of the method, apparatuses, and non-transitory computer-readable medium described herein may further include operations, features, means, or instructions for receiving, using a first receive beam of the set of multiple receive beams, at least one downlink control channel transmission of the set of multiple downlink control channel transmissions associated with a transmit beam of the first network entity based on the monitoring and measuring a cross-link interference level associated with the at least one downlink control channel transmission as one of the one or more cross-link interference measurements, where selecting the transmit beam may be based on the measuring.

In some examples of the method, apparatuses, and non-transitory computer-readable medium described herein, selecting the communication beam may include operations, features, means, or instructions for selecting a transmit beam associated with a lowest cross-link interference level of the one or more cross-link interference measurements and selecting a transmit beam associated with a cross-link interference level of the one or more cross-link interference measurements that may be smaller than a threshold cross-link interference level.

In some examples of the method, apparatuses, and non-transitory computer-readable medium described herein, selecting the communication beam may include operations, features, means, or instructions for selecting a transmit beam associated with a cross-link interference level of the one or more cross-link interference measurements that may be higher than a first threshold, where the communicating with the UE includes and transmitting, using the selected transmit beam, a downlink transmission using a reduced transmission power based on the cross-link interference level associated with the selected transmit beam being higher than the first threshold.

In some examples of the method, apparatuses, and non-transitory computer-readable medium described herein, selecting the communication beam may include operations, features, means, or instructions for selecting a receive beam associated with a lowest cross-link interference level of the one or more cross-link interference measurements and selecting a receive beam associated with a cross-link interference level of the one or more cross-link interference measurements that may be smaller than a threshold cross-link interference level.

In some examples of the method, apparatuses, and non-transitory computer-readable medium described herein, selecting the communication beam may include operations, features, means, or instructions for selecting a receive beam associated with a cross-link interference level of the one or more cross-link interference measurements that may be higher than a threshold, transmitting signaling indicating a power increase to the UE, where the communicating with the UE includes, and receiving, using the selected receive beam from the UE, an uplink transmission based on the power increase.

In some examples of the method, apparatuses, and non-transitory computer-readable medium described herein, the downlink control channel transmission pattern includes a set of time and frequency resources for a set of multiple downlink control channel transmission repetitions.

In some examples of the method, apparatuses, and non-transitory computer-readable medium described herein, the one or more cross-link interference measurements include one or more reference signal receive power measurements for each receive beam of the set of multiple receive beams.

In some examples of the method, apparatuses, and non-transitory computer-readable medium described herein, the set of multiple receive beams may be downlink beams.

In some examples of the method, apparatuses, and non-transitory computer-readable medium described herein, the set of multiple receive beams may be uplink beams.

A method for wireless communication is described. The method may include broadcasting, by a first network entity, an indication of a downlink control channel transmission pattern associated with the first network entity, transmitting a set of multiple downlink control channel transmissions using a set of multiple transmit beams according to the downlink control channel transmission pattern, where the set of multiple downlink control channel transmissions schedule resources for communications at the first network entity, and communicating during the scheduled resources, where the scheduled resources at least partially overlap in time and frequency with a scheduled communication at a second network entity.

An apparatus for wireless communication is described. The apparatus may include at least one processor; and memory coupled (e.g., operatively, communicatively, functionally, electronically, or electrically) with the at least one processor, the memory storing instructions executable by the at least one processor to cause the apparatus to executable by the processor to cause the apparatus to broadcast, by a first network entity, an indication of a downlink control channel transmission pattern associate with the first network entity, transmit a set of multiple downlink control channel transmissions using a set of multiple transmit beams according to the downlink control channel transmission pattern, where the set of multiple downlink control channel transmissions schedule resources for communications at the first network entity, and communicate during the scheduled resources, where the scheduled resources at least partially overlap in time and frequency with a scheduled communication at a second network entity.

Another apparatus for wireless communication is described. The apparatus may include means for broadcasting, by a first network entity, an indication of a downlink control channel transmission pattern associated with the first network entity, means for transmitting a set of multiple downlink control channel transmissions using a set of multiple transmit beams according to the downlink control channel transmission pattern, where the set of multiple downlink control channel transmissions schedule resources for communications at the first network entity, and means for communicating during the scheduled resources, where the scheduled resources at least partially overlap in time and frequency with a scheduled communication at a second network entity.

A non-transitory computer-readable medium storing code for wireless communication is described. The code may include instructions executable by at least one processor to broadcast, by a first network entity, an indication of a downlink control channel transmission pattern associate with the first network entity, transmit a set of multiple downlink control channel transmissions using a set of multiple transmit beams according to the downlink control channel transmission pattern, where the set of multiple downlink control channel transmissions schedule resources for communications at the first network entity, and communicate during the scheduled resources, where the scheduled resources at least partially overlap in time and frequency with a scheduled communication at a second network entity.

In some examples of the method, apparatuses, and non-transitory computer-readable medium described herein, the scheduled resources for communications at the first network entity include resources for an uplink transmission to the first network entity.

In some examples of the method, apparatuses, and non-transitory computer-readable medium described herein, communicating during the scheduled resources may include operations, features, means, or instructions for receiving the uplink transmission during the scheduled resources, where the scheduled communication at the second network entity may be a downlink transmission.

In some examples of the method, apparatuses, and non-transitory computer-readable medium described herein, the scheduled resources for communications at the first network entity include resources for a downlink communication by the first network entity.

In some examples of the method, apparatuses, and non-transitory computer-readable medium described herein, communicating during the scheduled resources may include operations, features, means, or instructions for transmitting the downlink communication during the scheduled resources, where scheduled communication at the second network entity may be an uplink transmission.

In some examples of the method, apparatuses, and non-transitory computer-readable medium described herein, the set of multiple downlink control channel transmissions schedule the communications at the first network entity to be performed using a communication beam having a same quasi-colocation root reference signal as a beam for transmitting or receiving the scheduled communication.

In some examples of the method, apparatuses, and non-transitory computer-readable medium described herein, the downlink control channel transmission pattern includes a set of time and frequency resources for a set of multiple downlink control channel transmission repetitions.

DETAILED DESCRIPTION

Figure 1:
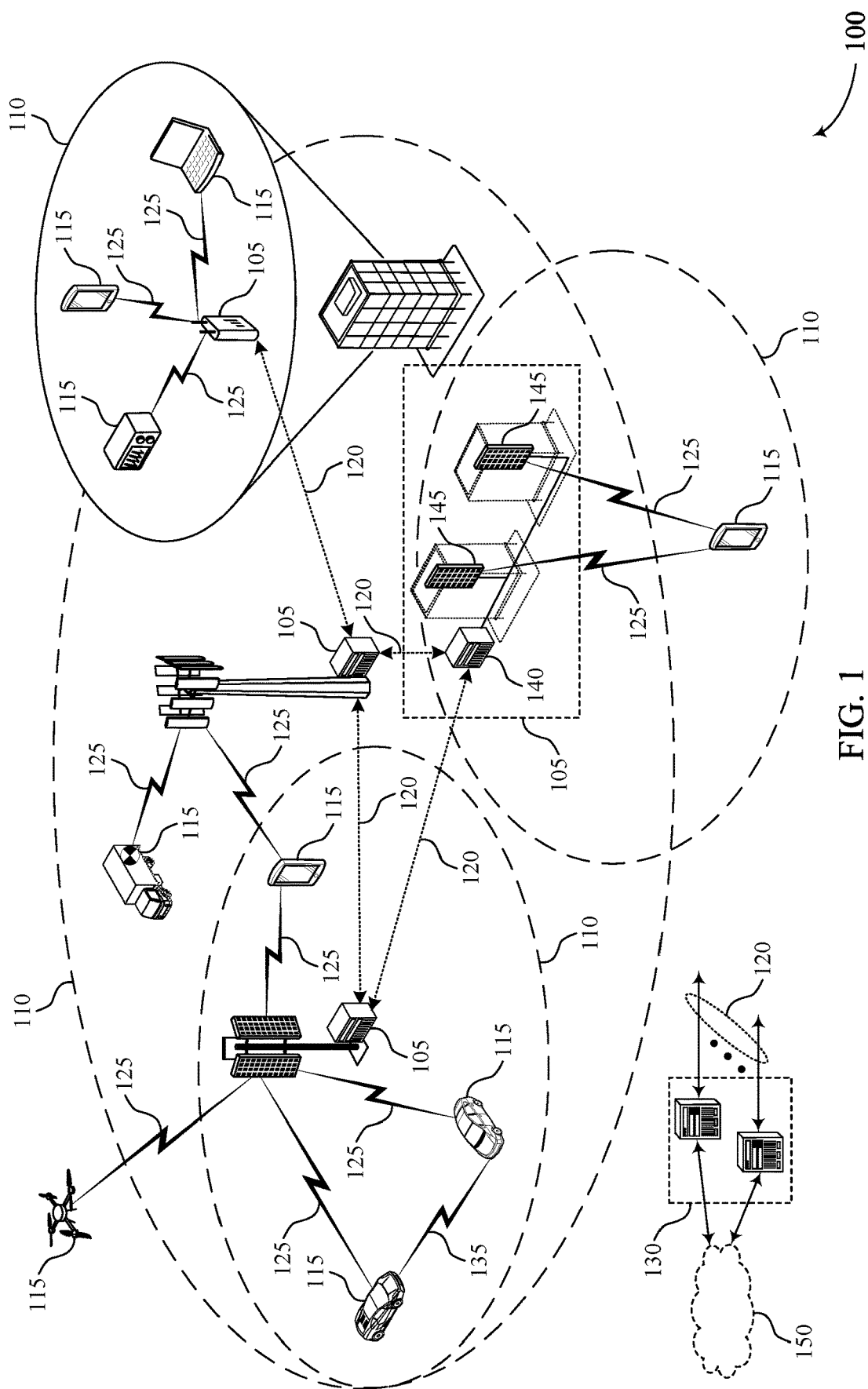
FIG. 1 illustrates an example of a wireless communications system that supports over-the-air (OTA) signaling for inter-base station cross link interference (CLI) measurements in accordance with aspects of the present disclosure.

A wireless communications system may include communication devices, such as a user equipment (UE) or a base station, that may support multiple radio access technologies. Examples of radio access technologies include 4G systems, such as LTE systems, and 5G systems, which may be referred to as NR systems. The communication devices may support wireless communication while operating in a half-duplex mode or a full-duplex mode. For example, a communication device (e.g., one or more components of a base station or a UE) may support wireless communications while operating in a full-duplex mode in which the communication device may simultaneously transmit and receive wireless communications using the same time resources (e.g., symbol, slot, or subframe) and the same frequency resources (e.g., frequency subband). That is, the communication device (such as a base station) may receive uplink communications and transmit downlink communications at a same time while operating in the full-duplex mode. In some examples, full-duplex communications may provide latency reduction, increase of spectrum efficiency (e.g., on a per-cell or per-UE or per-base station basis), more efficient resource utilization, and coverage enhancement among other examples.

Additionally or alternatively, the communication device may support wireless communications while operating in a half-duplex mode in which the communication device may transmit or receive wireless communications at a time. That is, the communication device (such as a base station) may receive uplink communications or transmit downlink communications at a time while operating in the half-duplex mode. Such situations may create interference with other communication devices. In some examples, a second base station may be susceptible to interference (also referred to as crosslink interference (CLI)) caused by communications at a first base station. For example, the first base station may communicate (e.g., transmit or receive wireless communications) at a same time that the second base station is transmitting or receiving wireless communication due to full-duplex operations or misaligned communication schedules and may cause interference at the second base station.

For example, a base station may receive signaling during communications with a first UE (or for example, any other wireless device) at the same time as a neighboring base station is transmitting to a second UE. In such examples, a receive panel of the base station may be enabled and the base station may experience noise (e.g., may unintentionally receive transmissions energy) from the neighboring base station transmissions. The base station and the neighboring base station may be respectively receiving/transmitting at a same time due to full-duplex operations or functions at the base station and the neighboring base station or due to misaligned transmission schedules in half duplex operations which may cause interference at the base station. In some examples, the interference caused by the neighboring base station communicating on an opposite communication link (e.g., downlink at the base station during uplink at the neighboring UE or vice versa) during a same time period may cause CLI. In some examples, the base station experiencing cross-link interference may be referred to as a victim base station and the base station causing the cross-link interference may be referred to as an aggressor base station.

The victim base station and the aggressor base station may coordinate to measure CLI and mitigate the associated affects using OTA channels (e.g., physical downlink control channel (PDCCH), physical downlink shared channel (PDSCH), physical uplink shared channel (PUSCH), physical uplink control channel (PUCCH), physical random access channel (PRACH)) as a reference signal for inter-base station CLI measurements and mitigation. For example, OTA signaling may be performed between base stations via Xn signaling.

For example, a receiving base station (e.g., a victim base station that is susceptible to interference from other base stations, or an aggressor base station that creates interference for other base stations) may receive a broadcast communication, from a transmitting base station, indicating a downlink control channel (e.g., physical downlink control channel (PDCCH) repetition pattern where each repetition may be used as a reference signal for measuring CLI by the receiving base station. The transmitting base station may transmit a number of PDCCH repetitions using a number of transmit beams and the receiving base station may monitor for the repetitions using a number of receive beams according to the repetition pattern.

The receiving entity may measure an interference level for each transmit/receive combination and may select a beam for communicating over an overlapping set of communication resources (e.g., overlapping time, or frequency resources, or both). Based on the measured interference level for each beam combination, the receiving base station may select a communication beam to communicate with a user equipment (UE). The selected communication beam may be, for example, associated with a lowest measured CLI level, a CLI level lower than a threshold or both. Additionally or alternatively, the receiving base station may configure the UE to transmit using a higher power (e.g., when the receiving base station is a victim base station) or may transmit to the UE using a lower power (e.g., when the receiving base station is an aggressor base station) according to the measured interference level for the selected communication beam.

As such the receiving base station (e.g., victim base station or aggressor base station) may mitigate interference caused by overlapping full-duplex communications or misaligned communication schedules at a victim base station.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to OTA signaling for inter-base station CLI measurements.

FIG. 1 illustrates an example of a wireless communications system 100 that supports OTA signaling for inter-base station CLI measurements in accordance with aspects of the present disclosure. The wireless communications system 100 may include one or more network entities (such as one or more components of one or more base stations 105), one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node or network entity. As used herein, a network node or network entity may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

As described herein, a base station 105 may include one or more components, such as network nodes or network entities, that are located at a single physical location or one or more components located at various physical locations. In examples in which the base station 105 includes components that are located at various physical locations, the various components may each perform various functions such that, collectively, the various components achieve functionality that is similar to a base station 105 that is located at a single physical location. As such, a base station 105 described herein may equivalently refer to a standalone base station 105 (also known as a monolithic base station) or a base station 105 including components that are located at various physical locations or virtualized locations (also known as a disaggregated base station). In some implementations, such a base station 105 including components that are located at various physical locations may be referred to as or may be associated with a disaggregated radio access network (RAN) architecture, such as an Open RAN (O-RAN) or Virtualized RAN (VRAN) architecture. In some implementations, such components of a base station 105 may include or refer to one or more of a central unit (or centralized unit CU), a distributed unit (DU), or a radio unit (RU).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

A base station 105 and a UE 115 may support wireless communication while operating in a half-duplex mode or a full-duplex mode. In some cases, the base station 105 and the UE 115 may support wireless communication, while operating in the half-duplex mode or the full-duplex mode, in various radio frequency spectrum ranges, such as a frequency range 2 (FR2). When operating in the half-duplex mode, the base station 105 and the UE 115 may separately (e.g., at different times) transmit wireless communication (e.g., uplink signals, downlink signals) or receive wireless communication (e.g., uplink signals, downlink signals). Alternatively, when operating in the full-duplex mode, the base station 105 and the UE 115 may simultaneously (e.g., at the same time) transmit wireless communication (e.g., uplink signals, downlink signals) and receive wireless communication (e.g., uplink signals, downlink signals).

The base station 105 may support communication of uplink signals using one panel (e.g., an antenna panel, an antenna port) and another panel for communication of downlink signals. For example, the base station 105 may receive uplink signals using one panel and transmit downlink signals using another panel. In some cases, the wireless communications while operating in the full-duplex mode may depend on a capability of the base station 105. Additionally or alternatively, to support full-duplex operations by the base station 105, the capability of the base station 105 may be based on a beam separation between beams for uplink signals and beams for downlink signals. In some other cases, to support full-duplex operations, by the base station 105, the capability of the base station 105 may be based on self-interference between uplink signals and downlink signals at the base station 105. In other cases, to support full-duplex operation by the base station 105, the capability of the base station 105 may be based on a clutter echo between uplink signals and downlink signals.

In some cases, scheduled communications between the base station 105 and a UE 115 may overlap in a time domain or a frequency domain, or both with scheduled communications between a neighboring base station 105 and another UE 115. As described herein, an overlap may between an uplink communications and downlink communications and may refer to a partial overlap or a full overlap in a time domain or a frequency domain, or both and may be caused by full-duplex operations at the base station 105 or due to a misaligned communications schedule for half-duplex operations between the base station 105 and the neighboring base station 105, for example, that causes the base station 105 to receive at a same time the neighboring base station transmits, or vice versa.

In some cases, due to the overlap, the base station 105 may be susceptible to interference (also referred to as CLI) from the other base station 105. In some examples, to reduce or eliminate interference (e.g., a CLI), the base station 105 may perform CLI measurement and beam selection based on receiving one or more reference signals from the neighboring base station 105.

For example, a base station 105 may receive, from a neighboring base station 105, a broadcast transmission indicating a downlink control channel transmission pattern associated with the neighboring base station 105. For examples, the pattern may indicate a set of communication resources on which the neighboring base station 105 may transmit a number of PDCCH repetitions. The base station 105 may monitor a plurality of receive beams for a plurality of downlink control channel transmissions from the neighboring base station 105 according to the downlink control channel transmission pattern. The base station 105 may select a communication beam according to one or more CLI measurements associated with one or more of the plurality of receive beams based on the monitoring, and may communicate with a UE 115 using the selected communication beam via a first set of resources that at least partially overlap in time and frequency with a scheduled communication at the neighboring base station 105.

In some examples, the first base station 105 may be experiencing CLI and the neighboring base station 105 may be causing CLI, or vice versa. By enabling the base station 105 (e.g., either of the victim or aggressor base station) to support measuring CLI results, the base station 105 may mitigate effects caused by CLI, among other examples, when performing communications in a full-duplex communications mode or according to a misaligned communications schedule with a UE 115.

Figure 2:
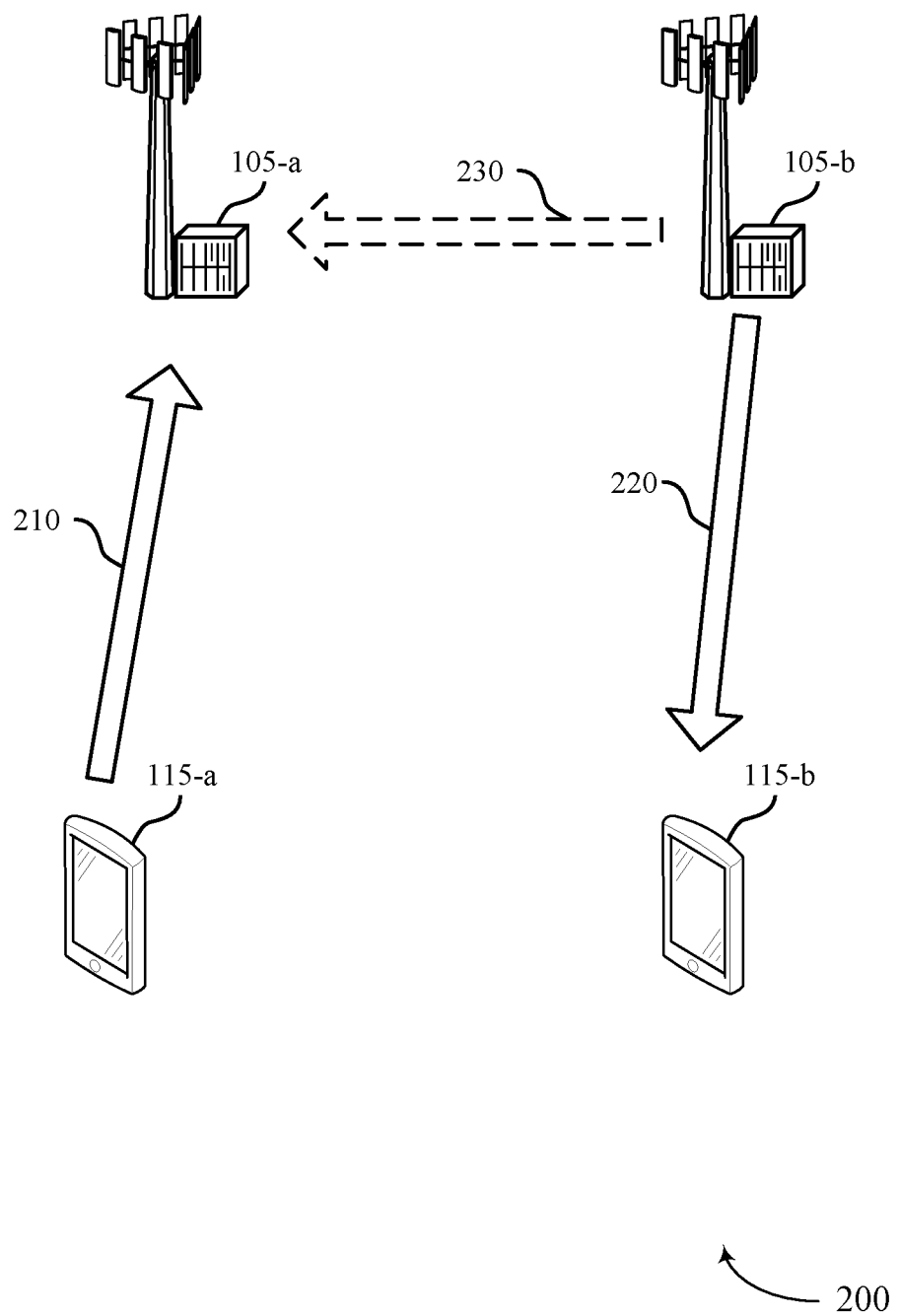
FIG. 2 illustrates an example of a wireless communications system that supports OTA signaling for inter-base station CLI measurements in accordance with aspects of the present disclosure.

FIG. 2 illustrates an example of a wireless communications system 200 that supports OTA signaling for inter-base station CLI measurements in accordance with aspects of the present disclosure. The wireless communications system 200 may implement aspects of the wireless communications system 100 or may be implemented by aspects of the wireless communications systems 100 as described with reference to FIG. 1. For example, the wireless communications system 200 may include a base station 105-a, a base station 105-b, a UE 115-a, and a UE 115-b, which may be examples of corresponding devices as described with reference to FIG. 1. One or more components of base station 105-a or base station 105-b may be considered a network entity, and in some examples base station 105-a and/or base station 105-b may have a disaggregated architecture, such as an O-RAN or VRAN architecture. In the example of FIG. 2, the base station 105-a may support wireless communications with the UE 115-a and the UE 115-b while operating in a full-duplex mode or a half-duplex mode in which the base station 105-a and the base station 105-b communicate according to a misaligned communication schedule (e.g., a schedule in which one base station transmits while another receives).

In the example of FIG. 2, base station 105-a may be enabled to perform full-duplex communications as described herein or may communicate according to a communication schedule that is oppositely aligned with a communication schedule of the base station 105-b. That is, the base station 105-a may receive uplink communications 210 from the UE 115-a over a same set of time resources, or frequency resources, or both, as base station 105-b transmits downlink communications 220 (e.g., PDSCH) to the UE 115-b. Thus, the base station 105-a may experience CLI 230 caused by the downlink transmissions performed by the base station 105-b while monitoring for uplink communications 210 from the UE 115-a. Thus the base station 105-a may be a victim base station and the base station 105-b may be an aggressor base station. As such, methods for CLI mitigation may be performed by the base station 105-a or the base station 105-b.

In a first example, the victim base station 105-a may transmit a plurality of PDCCH transmissions for CLI mitigation performed by the neighboring aggressor base station 105-b. For example, the base station 105-a may broadcast a PDCCH transmission pattern, and time or frequency resources, or both to the base station 105-b. The base station 105-b may monitor and measure the received PDCCH transmission, where the PDCCH may serve as an inter-base station CLI measurement signal (e.g., reference signal) for the base station 105-b (e.g., or additionally, one or more other neighboring aggressor base stations 105) to measure a corresponding interference level.

The base station 105-a may transmit the PDCCH transmissions or repetitions according to the broadcasted pattern, to the base station 105-b. The base station 105-b may monitor and measure each received PDCCH transmission, where: 1) each PDCCH transmission serves as an inter-base station CLI measurement signal (e.g., reference signal) for the base station 105-b to measure a CLI level and 2) the PDCCH transmissions schedule PUSCH transmissions for the base station 105-a during a set of symbols allocated for uplink transmissions at the base station 105-a (e.g., during U symbols), which may overlap (e.g., partially or fully) in time with one or more scheduled downlink communications at the base station 105-b. The base station 105-a may use a number of uplink beams to transmit a number of PDCCH repetitions, such that the base station 105-b may sweep a number of downlink beams to measure a per-downlink beam CLI reference signal received power (RSRP) for each uplink/downlink beam pair (e.g., corresponding to the base station 105-a and the base station 105-b respectively.

The base station 105-b may decode and measure the PDCCH transmissions to determine a corresponding CLI interference level for each uplink/downlink beam pair. For example, the base station 105-b may measure multiple downlink receive beams to receive the PDCCH repetitions.

Based on measurement results per downlink beam, the base station 105-b may choose or select a downlink beam to use for communications during the U symbols allocated to uplink communications (e.g., PUSCH scheduled by the PDCCH repetitions) at the base station 105-a.

In some examples, the base station 105-b may select the downlink beam having or associated with the lowest CLI interference level. In some examples, the base station 105-b may select the downlink beam associated with or having a CLI level that is less than a threshold (e.g., a predetermined threshold, a dynamically configured threshold, or a dynamically indicated threshold). In some examples, the base station 105-b may select the downlink beam having or associated with a CLI level that is relatively high (e.g., higher than a threshold or higher than a CLI level associated with another downlink beam) but may apply a power backoff when transmitting with the downlink beam having or associated with the relatively high CLI level. The base station 105-b may select the downlink beam having or associated with the relatively high CLI level for a number of reasons including channel conditions, availability of other downlink beams, reliability, or quality of service, among other examples.

In some examples, to ensure that the interference measurement performed using the PDCCH transmission may be applied or effective with the later-scheduled PUSCH transmissions for interference mitigation, the base station 105-a may transmit the PDCCH and may receive the scheduled PUSCH using a same common downlink/uplink beam or using uplink/downlink beams sharing a same quasi-colocation root reference signal (e.g., transmitting PDCCH may use a relatively wider beam, and receiving PUSCH may use a relatively narrower beam). Therefore, the PDCCH transmissions may be used for measurements by the base station 105-b to determine a path loss and hence the CLI level (path loss=reference signal transmit power-RSRP) for communications at the base station 105-b during the scheduled PUSCH on the U symbols allocated to the base station 105-a.

Thus, inter-base station CLI experienced by the base station 105-a may be mitigated by using OTA channels' measurements to select a downlink beam for overlapping communications at the base station 105-b.

In a second example, the aggressor base station 105-b may transmit a plurality of PDCCH transmissions for CLI mitigation performed by the victim base station 105-a. For example, the base station 105-b may broadcast a PDCCH transmission pattern and time or frequency resources, or both to the base station 105-a. The base station 105-a may monitor and measure the received PDCCH transmissions, where the PDCCH may serve as an inter-base station CLI measurement signal (e.g., reference signal) for the base station 105-a to measure a corresponding interference level. In some examples, this may use the assumption that the channel between base station 105-b and the base station 105-a is reciprocal.

The base station 105-b mat transmit the PDCCH transmission or repetitions according to the broadcasted pattern, to the base station 105-a. The base station 105-a may monitor and measure each received PDCCH transmission, where: 1) each PDCCH transmission serves as an inter-base station CLI measurement signal (e.g., reference signal) for the base station 105-a to measure a CLI level and 2) the PDCCH transmissions schedule PDSCH transmissions for the base station 105-b during a set of symbols allocated for downlink transmissions by the base station 105-b (e.g., during D symbols), which may overlap (e.g., partially or fully) in time with one or more scheduled uplink communications at the base station 105-a. The base station 105-b may use a number of downlink beams to transmit a number of PDCCH repetitions, such that the base station 105-a may sweep a number of uplink beams to measure a per-uplink beam CLI RSRP for each downlink/uplink beam pair (e.g., corresponding to the base station 105-b and the base station 105-a respectively.

The base station 105-a may decode and measure the PDCCH transmissions to determine a corresponding CLI interference level for each downlink/uplink beam pair. For example, the base station 105-a may measure multiple uplink receive beams to receive the PDCCH repetitions.

Based on measurement results per uplink beam, the base station 105-a may choose or select an uplink beam to use for communications during the D symbols allocated to downlink communications (e.g., PDSCH scheduled by the PDCCH repetitions) at the base station 105-b.

In some examples, the base station 105-a may select the uplink beam having or associated with the lowest CLI interference level. In some examples, the base station 105-a may select the uplink beam associated with or having a CLI level that is less than a threshold (e.g., a predetermined threshold, a dynamically configured threshold, or a dynamically indicated threshold). In some examples, the base station 105-a may select the uplink beam having or associated with a CLI level that is relatively high (e.g., higher than a threshold or higher than a CLI level associated with another uplink beam) but may indicate to the UE 115-a to transmit uplink communications using a higher transmit power for the selected beam communication. For example, the base station 105-a may select the uplink beam having or associated with the relatively high CLI level for a number of reasons including channel conditions, availability of other downlink beams, reliability, or quality of service, among other examples and may transmit a configuration to the UE 115-a that indicated the UE 115-a is to transmit uplink communications for the selected uplink beam using a higher transmit power.

In some examples, to ensure that the interference measurement performed using the PDCCH transmission may be applied or effective with the later-scheduled PDSCH transmissions for interference mitigation, the base station 105-b may transmit the PDCCH and may transmit the scheduled PDSCH using a same common multi-downlink channel beam or using downlink beams sharing a same quasi-colocation root reference signal (e.g., transmitting PDCCH may use a relatively wider beam, and transmitting PDSCH may use a relatively narrower beam). Therefore, the PDCCH transmissions may be used for measurements by the base station 105-a to determine a path loss and hence the CLI level (path loss=reference signal transmit power-RSRP) for communications at the base station 105-a during the scheduled PDSCH on the D symbols allocated to the base station 105-b.

Thus, inter-base station CLI experienced by the base station 105-a may be mitigated by using OTA channels' measurements to select an uplink beam for overlapping communications with the base station 105-b.

Figure 3A:
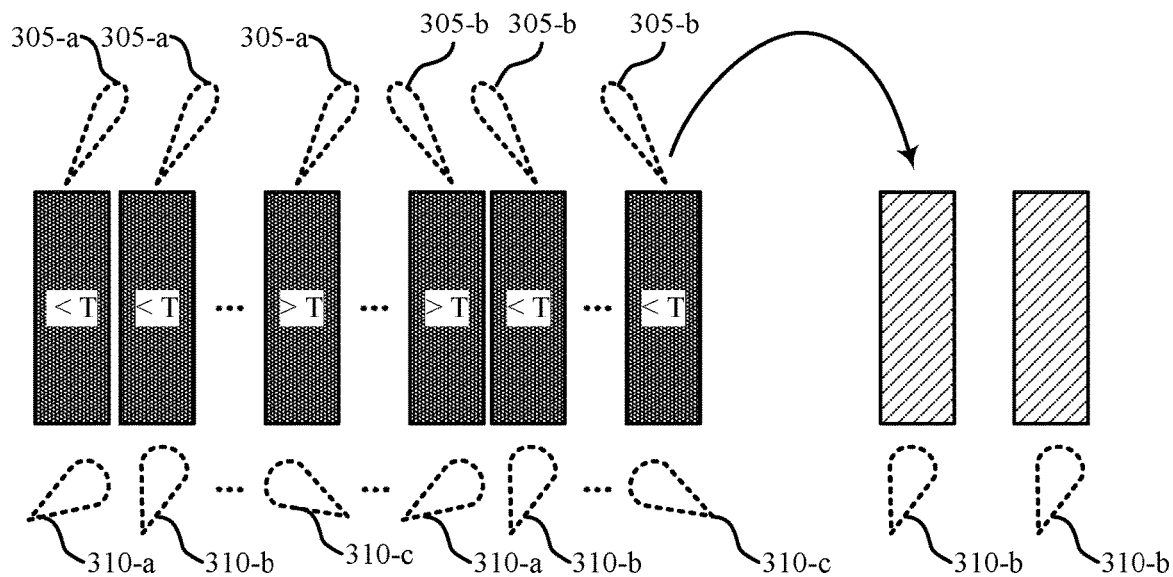
FIGS. 3A & 3B illustrate examples of a wireless communications system that each support OTA signaling for inter-base station CLI measurements in accordance with aspects of the present disclosure.
Figure 3B:
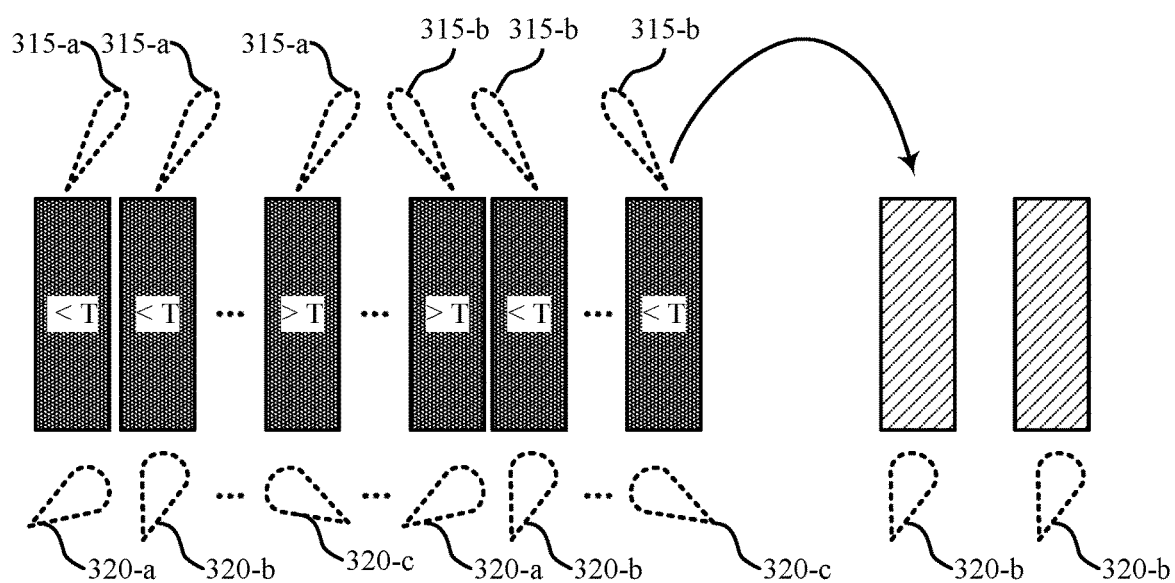

FIGS. 3A & 3B illustrate an example of wireless communications systems 301 and 302, respectively, that each supports OTA signaling for inter-base station CLI measurements in accordance with aspects of the present disclosure. In some examples, the wireless communications systems 301 and 302 may implement or be implemented by aspects of the wireless communications system 100 and 200. For example, the wireless communications systems 301 and 302 may be implemented by base stations 105 and UEs 115 as described with reference to FIG. 1.

In the example of FIG. 3A, a victim base station 105 may transmit a plurality of PDCCH transmissions for CLI mitigation performed by a neighboring aggressor base station 105. One or more components of the victim base station 105 or the aggressor base station 105 may be considered a network entity, and in some examples the victim base station 105 and/or the aggressor base station 105 may have a disaggregated architecture, such as an O-RAN or VRAN architecture For example, the victim base station 105 may transmit a plurality of PDCCH transmissions (e.g., repetitions) using a plurality of uplink beams 305. For example, a first portion of PDCCH transmissions may be transmitted with an uplink beam 305-a and a second portion of the PDCCH transmissions may be transmitted with an uplink beam 305-b.

The aggressor base station 105 may monitor for the PDCCH transmissions. For example, the aggressor base station 105 may sweep a plurality of downlink beams 310 to identify a downlink receive beam that causes a relatively low amount of CLI with respect to each of the plurality of uplink transmission beams. For example, the aggressor base station 105 may use a downlink beam 310-a to receive a first PDCCH transmission communicated using uplink beam 305-a and to receive a first PDCCH transmission communicated using uplink beam 305-b (e.g., the fourth depicted PDCCH repetition of FIG. 3A). The aggressor base station 105 may use a downlink beam 310-b to receive a second PDCCH transmission communicated using uplink beam 305-a (e.g., the second depicted PDCCH repetition of FIG. 3A) and to receive a second PDCCH transmission communicated using uplink beam 305-b (e.g., the fifth depicted PDCCH repetition of FIG. 3A). The aggressor base station 105 may use a downlink beam 310-c to receive a third PDCCH transmission communicated using uplink beam 305-a (e.g., the third depicted PDCCH repetition of FIG. 3A) and to receive a third PDCCH transmission communicated using uplink beam 305-b (e.g., the sixth depicted PDCCH repetition of FIG. 3A). In such a way, the aggressor base station 105 may measure a CLI associated with each uplink/downlink beam pair.

For example, the aggressor base station 105 may determine that a CLI level associated with the uplink beam 305-a and the downlink beam 310-a is less than a CLI level threshold, T but a CLI level associated with the uplink beam 305-b and the same downlink beam, 310-a is larger than the CLI threshold. The aggressor base station 105 may determine that a CLI level associated with the uplink beam 305-a and the downlink beam 310-c is greater than the CLI level threshold, T but a CLI level associated with the uplink beam 305-b and the same downlink beam, 310-c is less than the CLI threshold, T. Thus, in some examples, because each of downlink beams 310-a and 310-c cause a CLI level to be greater than the CLI threshold, T with at least one of uplink beams 305-a and 305-b, there may be another more suitable downlink beam 310 for selection by the aggressor base station 105.

For example, the aggressor base station 105 may determine that a CLI level associated with the uplink beam 305-a and the downlink beam 310-b is less than a CLI level threshold, T and that a CLI level associated with the uplink beam 305-b and the same downlink beam, 310-b is also less than the CLI threshold. This may indicate downlink beam 310-b as a more suitable downlink beam (e.g., may generally cause less CLI during overlapping communications when each uplink beam of the victim base station is taken into account) than downlink beams 310-a and 310-c.

Thus, based on sweeping each downlink beam 310 to receive a PDCCH repetition transmitted by each uplink beam 305, the aggressor base station 105 may determine that downlink beam 310-b may most effectively mitigate CLI at the victim base station 105.

The PDCCH repetitions may schedule a number of data communications (e.g., PUSCH communications) for reception by the victim base station 105. For example, the victim base station '05 may receive a PUSCH communication on each of a number of U symbols. The aggressor base station 105 may be scheduled to communicate during at least one of the U symbols and may transmit using the selected downlink beam 310-*b* identified as causing a relatively low amount of CLI based on the measurements performed by the aggressor base station 105.

In the example of FIG. 3B, an aggressor base station may transmit a plurality of PDCCH transmissions for CLI mitigation performed by a victim base station.

For example, the aggressor base station 105 may transmit a plurality of PDCCH transmissions (e.g., repetitions) using a plurality of downlink beams 315. For example, a first portion of PDCCH transmissions may be transmitted with a downlink beam 315-*a* and a second portion of the PDCCH transmissions may be transmitted with a downlink beam 315-*b*.

The victim base station 105 may monitor for the PDCCH transmissions. For example, the victim base station 105 may sweep a plurality of uplink beams 320 to identify an uplink receive beam that causes a relatively low amount of CLI with respect to each of the plurality of downlink transmission beams 315. For example, the victim base station 105 may use an uplink beam 320-*a* to receive a first PDCCH transmission communicated using downlink beam 315-*a* and to receive a first PDCCH transmission communicated using downlink beam 315-*b* (e.g., the fourth depicted PDCCH repetition of FIG. 3B). The victim base station 105 may use an uplink beam 320-*b* to receive a second PDCCH transmission communicated using downlink beam 315-*a* (e.g., the second depicted PDCCH repetition of FIG. 3B) and to receive a second PDCCH transmission communicated using downlink beam 315-*b* (e.g., the fifth depicted PDCCH repetition of FIG. 3B). The victim base station 105 may use an uplink beam 320-*c* to receive a third PDCCH transmission communicated using downlink beam 315-*a* (e.g., the third depicted PDCCH repetition of FIG. 3B) and to receive a third PDCCH transmission communicated using downlink beam 315-*b* (e.g., the sixth depicted PDCCH repetition of FIG. 3B). In such a way, the victim base station 105 may measure a CLI associated with each uplink/downlink beam pair.

For example, the victim base station 105 may determine that a CLI level associated with the downlink beam 315-*a* and the uplink beam 320-*a* is less than a CLI level threshold, T but a CLI level associated with the downlink beam 315-*b* and the same uplink beam, 320-*a* is larger than the CLI threshold. The victim base station 105 may determine that a CLI level associated with the downlink beam 315-*a* and the uplink beam 320-*c* is greater than the CLI level threshold, T but a CLI level associated with the downlink beam 315-*b* and the same uplink beam, 320-*c* is less than the CLI threshold, T. Thus, in some examples, because each of uplink beams 320-*a* and 320-*c* cause a CLI level to be greater than the CLI threshold, T with at least one of downlink beams 315-*a* and 315-*b*, there may be another more suitable uplink beam 320 for selection by the victim base station 105.

For example, the victim base station 105 may determine that a CLI level associated with the downlink beam 315-*a* and the uplink beam 320-*b* is less than a CLI level threshold, T and that a CLI level associated with the downlink beam 315-*b* and the same uplink beam, 320-*b* is also less than the CLI threshold. This may indicate uplink beam 320-*b* as a more suitable uplink beam (e.g., may generally cause less CLI during overlapping communications when each downlink beam of the aggressor base station is taken into account) than uplink beams 320-*a* and 320-*c*.

Thus, based on sweeping each uplink beam 320 to receive a PDCCH repetition transmitted by each downlink beam 315, the victim base station 105 may determine that uplink beam 320-*b* may most effectively mitigate CLI at the victim base station 105.

The PDCCH repetitions may schedule a number of data communications (e.g., PDSCH communications) for transmission by the aggressor base station 105. For example, the aggressor base station 105 may transmit a PDSCH communication on each of a number of D symbols. The victim base station 105 may be scheduled to communicate during at least one of the D symbols and may communicate using the selected uplink beam 320-*b* identified as causing a relatively low amount of CLI based on the measurements performed by the victim base station 105.

Figure 4:
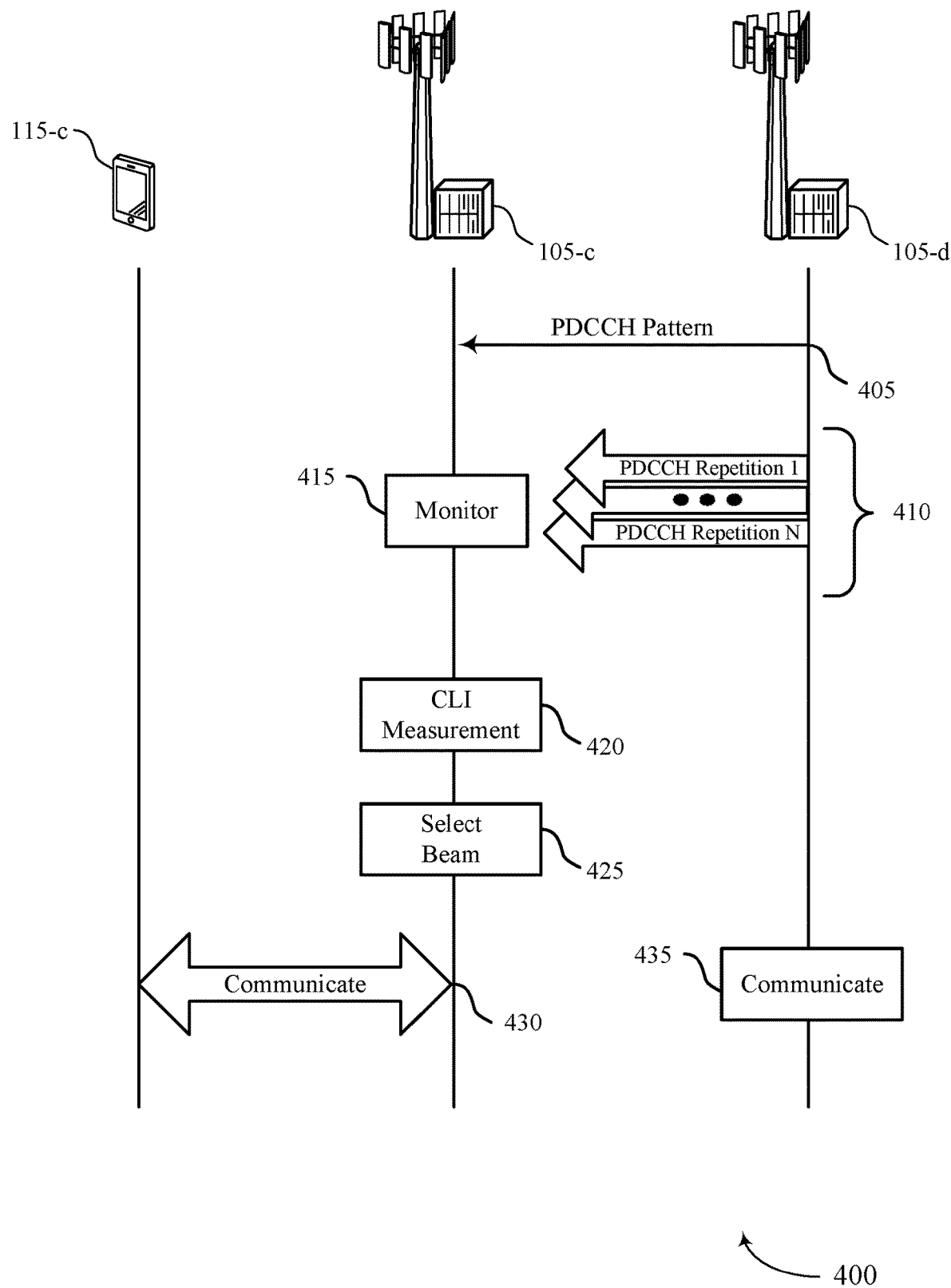
FIG. 4 illustrates an example of a process flow that supports OTA signaling for inter-base station CLI measurements in accordance with aspects of the present disclosure.

FIG. 4 illustrates an example of a process flow 400 that supports OTA signaling for inter-base station CLI measurements in accordance with aspects of the present disclosure. The process flow 400 may implement or be implemented by aspects of wireless communications system 100 or 200 or 300. For example, the process flow 400 may illustrate operations between a UE 115-*c*, a base station 105-*c*, and a base station 105-*d* which may be examples of a UE 115 and a base station 105, as described with reference to FIG. 1. One or more components of base station 105-*c* or base station 105-*d* may be considered a network entity, and in some examples base station 105-*c* and/or base station 105-*d* may have a disaggregated architecture, such as an O-RAN or VRAN architecture.

In the following description of the process flow 400, the operations between the UE 115-*c*, the base station 105-*c*, and the base station 105-*d* may be transmitted in a different order than the example order shown, or the operations performed by the UE 115-*c*, the base station 105-*c*, and the base station 105-*d* may be performed in different orders or at different times or by different devices. Some operations may also be omitted from the process flow 400, and other operations may be added to the process flow 400.

At 405, the base station 105-*d* may transmit a broadcast communication that indicates a downlink control channel (e.g., PDCCH) transmission pattern. For example, the indication may include a set of time or frequency resources, or both via which the base station 105-*d* will transmit one or more PDCCH repetitions.

At 410, the base station 105-*d* may transmit a plurality of downlink control channel transmissions (e.g., PDCCH repetitions) to the base station 105-*d*. In some examples, the base station may transmit the plurality of downlink control channel transmissions using each of a plurality of transmit beams of the base station 105-*c*. In some examples, the plurality of downlink control channel transmissions schedule communications at the base station 105-*d* to be performed using a communication beam having a same quasi-colocation root reference signal as or that is wider than a beam for communications between the base station 105-*c* and the UE 115-*c*.

At 415, the base station 105-*c* may monitor for the plurality of downlink control channel transmissions (e.g., PDCCH transmissions) from the base station 105-*d* according to the downlink control channel transmission pattern. For example, the base station 105-*c* may monitor the time or frequency resources or both, indicated by the downlink control channel transmission pattern for the PDCCH repetitions. In some examples, the base station 105-*c* may monitor using a plurality of receive beams of the base station 105-*c*.

At 420, the base station 105-*c* may perform one or more CLI measurements (e.g., RSRP measurements) based on receiving at least one transmission of the plurality of PDCCH transmissions. For example, the base station 105-*c* may receive, using a first receive beam, the at least one transmission from the base station 105-*d* using a first transmit beam. The base station 105-*c* may measure the cross-link interference caused by communications using the pair of first beams. In some examples, the measured CLI may be compared to a threshold CLI. The base station 105-*c* may perform a CLI measurement for each receive beam that receives a downlink control channel transmission from the base station 105-*d* using each of the plurality of transmit beams. That is, a CLI measurement may be performed for each receive beam/transmit beam pairing.

At 425, the base station 105-*c* may select a beam for communications with the UE 115-*c*. In some examples, the base station 105-*c* may be an aggressor base station. That is, downlink transmissions performed by the base station 105-*c* may cause interference at the base station 105-*d* when receiving uplink communications at a same time as the downlink transmissions (e.g., using a set of resources that at least partially overlap with resources for receiving the uplink communications). In such examples, the base station 105-*c* may select a transmit beam for transmitting communications to the UE 115-*c* according to the CLI measurements performed at 420. In such examples, the plurality of receive beams may be downlink receive beams. In some examples, the base station 105-*c* may select a transmit beam associated with a lowest CLI level of the CLI measurements, or may select a transmit beam associated with a CLI level that is smaller than a threshold CLI level, or may selecting a transmit beam associated with a CLI level that is higher than a first threshold.

If the base station 105-*c* selects a transmit beam having a CLI level that is higher than the first threshold, then at 430, the base station 105-*c* may communicate with the UE 115-*c* by transmitting using the selected transmit beam and using a reduced transmission power to mitigate CLI caused by the selected transmit beam.

In some examples, the base station 105-*c* may be a victim base station. That is, downlink transmissions performed by the base station 105-*d* may cause interference at the base station 105-*c* when receiving uplink communications at a same time as the downlink transmissions (e.g., using a set of resources that at least partially overlap with resources for receiving the uplink communications). In such examples, the base station 105-*c* may select a receive beam for receiving communications from the UE 115-*c* according to the CLI measurements performed at 420. In such examples, the plurality of receive beams may be uplink receive beams. In some examples, the base station 105-*c* may select a receive beam having a lowest CLI level according to the CLI measurements performed at 420, or may select a receive beam having a CLI level that is smaller than a threshold CLI level, or may select a receive beam having a CLI level that is higher than a threshold.

If the base station 105-*c* selects a receive beam having a CLI level that is higher than the threshold, the base station may transmit signaling indicating a power increase to the UE 115-*c*, then at 430, the base station 105-*c* may communicate with the UE 115-*c* by receiving, using the selected receive beam, an uplink transmission from the UE 115-*c* based on the power increase to mitigate CLI experienced by the selected receive beam.

At 430, the base station 105-*c* may communicate with the UE 115-*c* using the selected communication beam and a first set of resources that at least partially overlap in time and frequency with scheduled communications at the base station 105-*d*. However, using the communication beam selected based on the CLI measurements may mitigate the effects of CLI caused by the overlapping communications.

At 435, the base station 105-*d* may communicate with one or more other entities over the first set of resources that at least partially overlap in time and frequency with scheduled communications at the base station 105-*c*.

Figure 5:
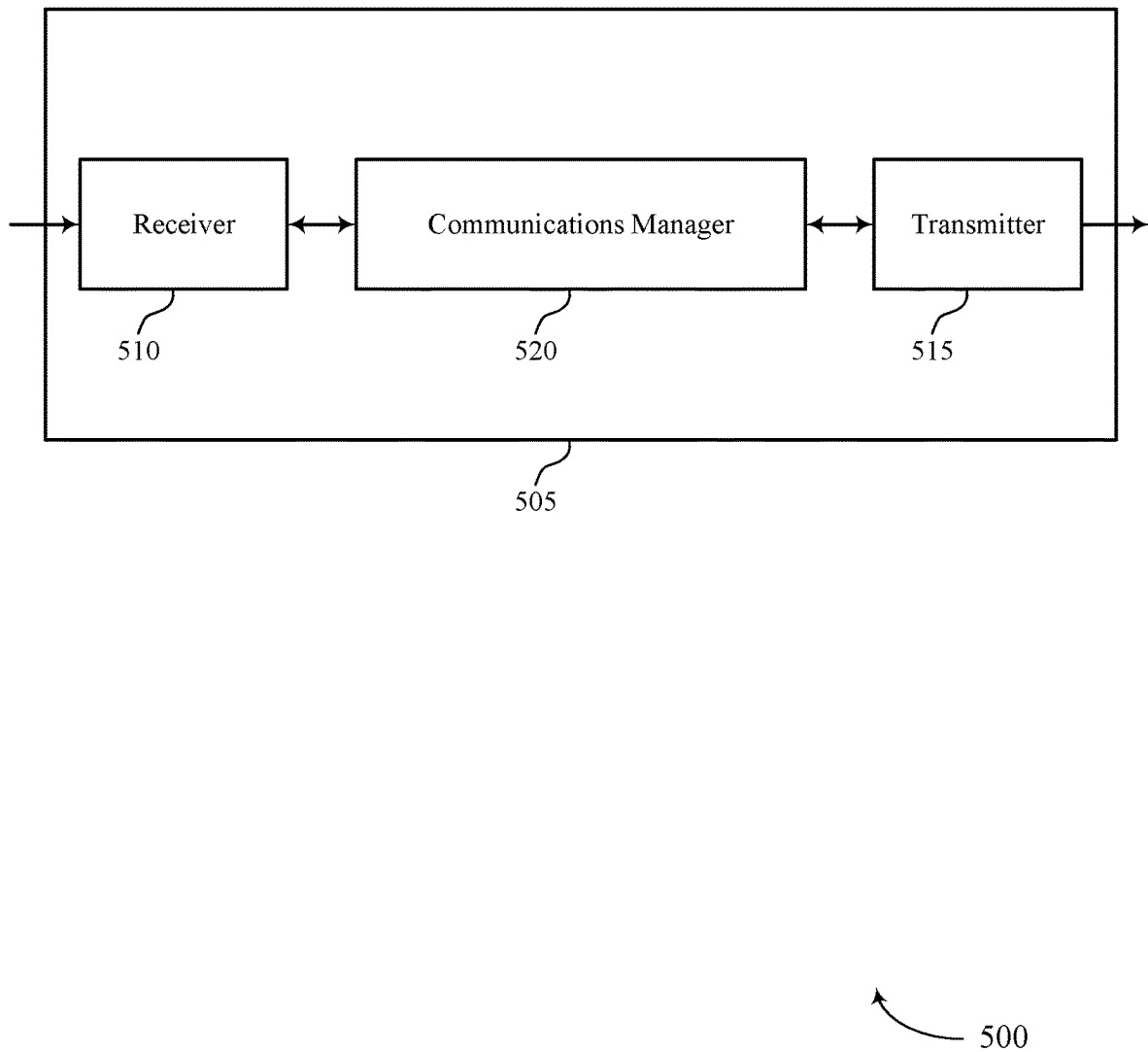
FIGS. 5 and 6 show block diagrams of devices that support OTA signaling for inter-base station CLI measurements in accordance with aspects of the present disclosure.

FIG. 5 shows a block diagram 500 of a device 505 that supports OTA signaling for inter-base station CLI measurements in accordance with aspects of the present disclosure. The device 505 may be an example of aspects of a network entity, such as one or more components of a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to OTA signaling for inter-base station CLI measurements). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to OTA signaling for inter-base station CLI measurements). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of OTA signaling for inter-base station CLI measurements as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an ASIC, a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software) executed by a processor. If implemented in code executed by a processor, the functions of the communications manager 520, the receiver 510, the transmitter 515, or various combinations or components thereof may be performed by a general-purpose processor, a DSP, a CPU, a graphics processing unit (GPU) an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication in accordance with examples as disclosed herein. For example, the communications manager 520 may be configured as or otherwise support a means for receiving, from a first network entity, a broadcast indicating a downlink control channel transmission pattern associated with the first network entity. The communications manager 520 may be configured as or otherwise support a means for monitoring a set of multiple receive beams at a second network entity for a set of multiple downlink control channel transmissions from the first network entity according to the downlink control channel transmission pattern. The communications manager 520 may be configured as or otherwise support a means for selecting a communication beam according to one or more cross-link interference measurements associated with one or more of the set of multiple receive beams in accordance with the monitoring. The communications manager 520 may be configured as or otherwise support a means for communicating with a UE using the selected communication beam and a first set of resources that at least partially overlap in time and frequency with a scheduled communication at the first network entity.

Additionally or alternatively, the communications manager 520 may support wireless communication in accordance with examples as disclosed herein. For example, the communications manager 520 may be configured as or otherwise support a means for broadcasting, by a first network entity, an indication of a downlink control channel transmission pattern associating with the first network entity. The communications manager 520 may be configured as or otherwise support a means for transmitting a set of multiple downlink control channel transmissions using a set of multiple transmit beams according to the downlink control channel transmission pattern, where the set of multiple downlink control channel transmissions schedule resources for communications at the first network entity. The communications manager 520 may be configured as or otherwise support a means for communicating during the scheduled resources, where the scheduled resources at least partially overlap in time and frequency with a scheduled communication at a second network entity.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources, among other examples.

Figure 6:
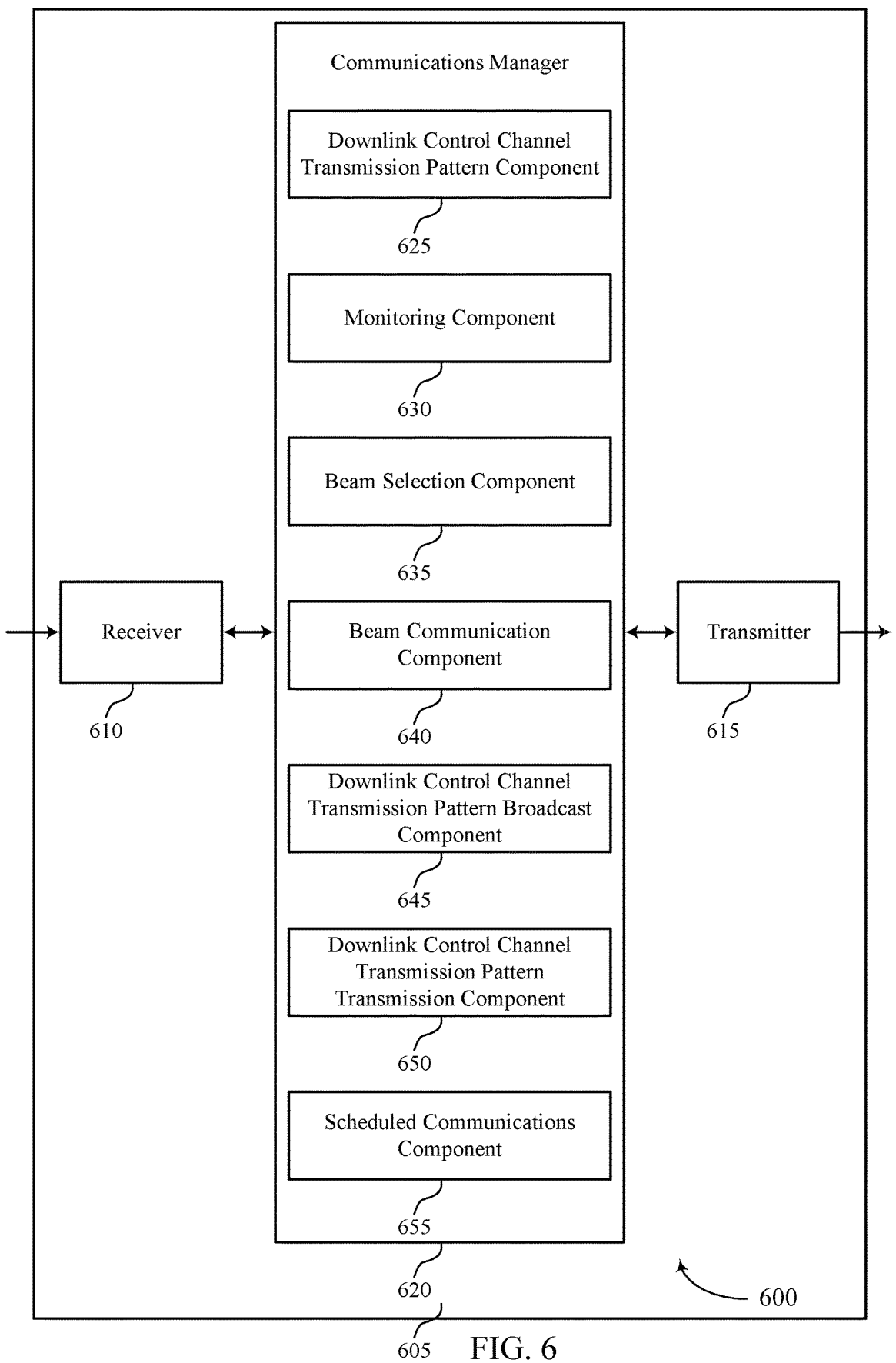

FIG. 6 shows a block diagram 600 of a device 605 that supports OTA signaling for inter-base station CLI measurements in accordance with aspects of the present disclosure. The device 605 may be an example of aspects of a device 505 or a network entity, such as one or more components of a base station 105, as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to OTA signaling for inter-base station CLI measurements). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to OTA signaling for inter-base station CLI measurements). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of OTA signaling for inter-base station CLI measurements as described herein. For example, the communications manager 620 may include a downlink control channel transmission pattern component 625, a monitoring component 630, a beam selection component 635, a beam communication component 640, a downlink control channel transmission pattern broadcast component 645, a downlink control channel transmission pattern transmission component 650, a scheduled communications component 655, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication in accordance with examples as disclosed herein. The downlink control channel transmission pattern component 625 may be configured as or otherwise support a means for receiving, from a first network entity, a broadcast indicating a downlink control channel transmission pattern associated with the first network entity. The monitoring component 630 may be configured as or otherwise support a means for monitoring a set of multiple receive beams at a second network entity for a set of multiple downlink control channel transmissions from the first network entity according to the downlink control channel transmission pattern. The beam selection component 635 may be configured as or otherwise support a means for selecting a communication beam according to one or more cross-link interference measurements associated with one or more of the set of multiple receive beams in accordance with the monitoring. The beam communication component 640 may be configured as or otherwise support a means for communicating with a UE using the selected communication beam and a first set of resources that at least partially overlap in time and frequency with a scheduled communication at the first network entity.

Additionally or alternatively, the communications manager 620 may support wireless communication in accordance with examples as disclosed herein. The downlink control channel transmission pattern broadcast component 645 may be configured as or otherwise support a means for broadcasting, by a first network entity, an indication of a downlink control channel transmission pattern associated with the first network entity. The downlink control channel transmission pattern transmission component 650 may be configured as or otherwise support a means for transmitting a set of multiple downlink control channel transmissions using a set of multiple transmit beams according to the downlink control channel transmission pattern, where the set of multiple downlink control channel transmissions schedule resources for communications at the first network entity. The scheduled communications component 655 may be configured as or otherwise support a means for communicating during the scheduled resources, where the scheduled resources at least partially overlap in time and frequency with a scheduled communication at a second network entity.

Figure 7:
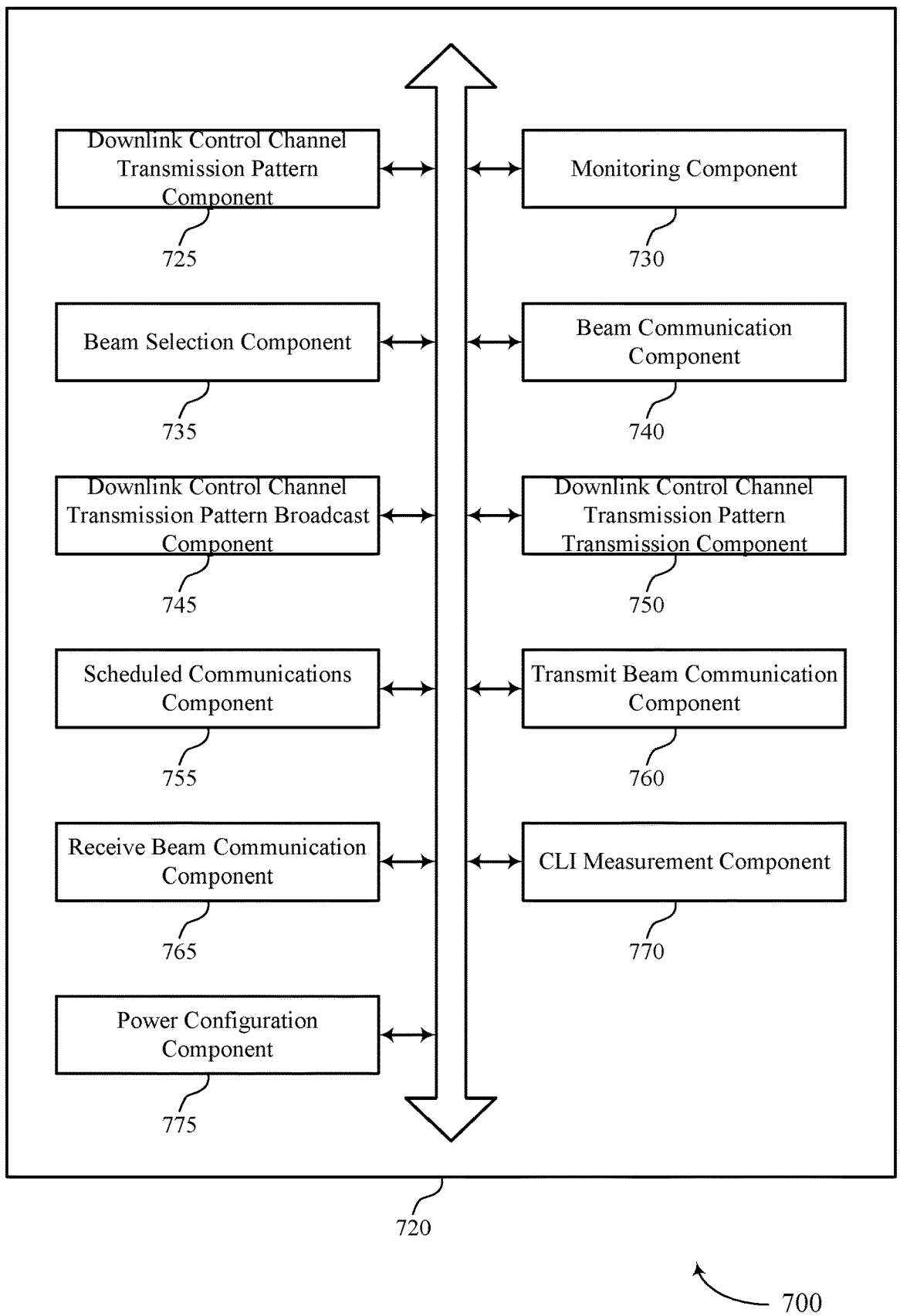
FIG. 7 shows a block diagram of a communications manager that supports OTA signaling for inter-base station CLI measurements in accordance with aspects of the present disclosure.

FIG. 7 shows a block diagram 700 of a communications manager 720 that supports OTA signaling for inter-base station CLI measurements in accordance with aspects of the present disclosure. The communications manager 720 may be an example of aspects of a communications manager 520, a communications manager 620, or both, as described herein. The communications manager 720, or various components thereof, may be an example of means for performing various aspects of OTA signaling for inter-base station CLI measurements as described herein. For example, the communications manager 720 may include a downlink control channel transmission pattern component 725, a monitoring component 730, a beam selection component 735, a beam communication component 740, a downlink control channel transmission pattern broadcast component 745, a downlink control channel transmission pattern transmission component 750, a scheduled communications component 755, a transmit beam communication component 760, a receive beam communication component 765, a CLI measurement component 770, a power configuration component 775, or any combination thereof. Each of these components may communicate, directly or indirectly, with one another (e.g., via one or more buses).

The communications manager 720 may support wireless communication in accordance with examples as disclosed herein. The downlink control channel transmission pattern component 725 may be configured as or otherwise support a means for receiving, from a first network entity, a broadcast indicating a downlink control channel transmission pattern associated with the first network entity. The monitoring component 730 may be configured as or otherwise support a means for monitoring a set of multiple receive beams at a second network entity for a set of multiple downlink control channel transmissions from the first network entity according to the downlink control channel transmission pattern. The beam selection component 735 may be configured as or otherwise support a means for selecting a communication beam according to one or more cross-link interference measurements associated with one or more of the set of multiple receive beams in accordance with the monitoring. The beam communication component 740 may be configured as or otherwise support a means for communicating with a UE using the selected communication beam and a first set of resources that at least partially overlap in time and frequency with a scheduled communication at the first network entity.

In some examples, to support communication beam includes a transmit beam and communicating with the UE, the transmit beam communication component 760 may be configured as or otherwise support a means for performing a downlink transmission from the second network entity to the UE using the selected transmit beam, where the scheduled communication at the first network entity includes an uplink transmission to the first network entity scheduled by the set of multiple downlink control channel transmissions.

In some examples, to support communication beam includes a receive beam and communicating with the UE, the receive beam communication component 765 may be configured as or otherwise support a means for receiving an uplink communication from the UE using the selected receive beam, where the scheduled communication at the first network entity includes a downlink transmission from the first network entity scheduled by the set of multiple downlink control channel transmissions.

In some examples, the receive beam communication component 765 may be configured as or otherwise support a means for receiving, using a first receive beam of the set of multiple receive beams, at least one downlink control channel transmission of the set of multiple downlink control channel transmissions associated with a transmit beam of the first network entity based on the monitoring. In some examples, the CLI measurement component 770 may be configured as or otherwise support a means for measuring a cross-link interference level associated with the at least one downlink control channel transmission as one of the one or more cross-link interference measurements, where selecting the transmit beam is based on the measuring.

In some examples, to support selecting the communication beam, the beam selection component 735 may be configured as or otherwise support a means for selecting a transmit beam associated with a lowest cross-link interference level of the one or more cross-link interference measurements. In some examples, to support selecting the communication beam, the beam selection component 735 may be configured as or otherwise support a means for selecting a transmit beam associated with a cross-link interference level of the one or more cross-link interference measurements that is smaller than a threshold cross-link interference level.

In some examples, to support selecting the communication beam, the beam selection component 735 may be configured as or otherwise support a means for selecting a transmit beam associated with a cross-link interference level of the one or more cross-link interference measurements that is higher than a first threshold, where the communicating with the UE includes. In some examples, to support selecting the communication beam, the beam selection component 735 may be configured as or otherwise support a means for transmitting, using the selected transmit beam, a downlink transmission using a reduced transmission power based on the cross-link interference level associated with the selected transmit beam being higher than the first threshold.

In some examples, to support selecting the communication beam, the beam selection component 735 may be configured as or otherwise support a means for selecting a receive beam associated with a lowest cross-link interference level of the one or more cross-link interference measurements. In some examples, to support selecting the communication beam, the beam selection component 735 may be configured as or otherwise support a means for selecting a receive beam associated with a cross-link interference level of the one or more cross-link interference measurements that is smaller than a threshold cross-link interference level.

In some examples, to support selecting the communication beam, the beam selection component 735 may be configured as or otherwise support a means for selecting a receive beam associated with a cross-link interference level of the one or more cross-link interference measurements that is higher than a threshold. In some examples, to support selecting the communication beam, the power configuration component 775 may be configured as or otherwise support a means for transmitting signaling indicating a power increase to the UE, where the communicating with the UE includes. In some examples, to support selecting the communication beam, the receive beam communication component 765 may be configured as or otherwise support a means for receiving, using the selected receive beam from the UE, an uplink transmission based on the power increase.

In some examples, the downlink control channel transmission pattern includes a set of time and frequency resources for a set of multiple downlink control channel transmission repetitions.

In some examples, the one or more cross-link interference measurements include one or more reference signal receive power measurements for each receive beam of the set of multiple receive beams.

In some examples, the set of multiple receive beams are downlink beams.

In some examples, the set of multiple receive beams are uplink beams.

Additionally or alternatively, the communications manager 720 may support wireless communication in accordance with examples as disclosed herein. The downlink control channel transmission pattern broadcast component 745 may be configured as or otherwise support a means for broadcasting, by a first network entity, an indication of a downlink control channel transmission pattern associated with the first network entity. The downlink control channel transmission pattern transmission component 750 may be configured as or otherwise support a means for transmitting a set of multiple downlink control channel transmissions using a set of multiple transmit beams according to the downlink control channel transmission pattern, where the set of multiple downlink control channel transmissions schedule resources for communications at the first network entity. The scheduled communications component 755 may be configured as or otherwise support a means for communicating during the scheduled resources, where the scheduled resources at least partially overlap in time and frequency with a scheduled communication at a second network entity.

In some examples, the scheduled resources for communications at the first network entity include resources for an uplink transmission to the first network entity.

In some examples, to support communicating during the scheduled resources, the scheduled communications component 755 may be configured as or otherwise support a means for receiving the uplink transmission during the scheduled resources, where the scheduled communication at the second network entity is a downlink transmission.

In some examples, the scheduled resources for communications at the first network entity include resources for a downlink communication by the first network entity.

In some examples, to support communicating during the scheduled resources, the scheduled communications component 755 may be configured as or otherwise support a means for transmitting the downlink communication during the scheduled resources, where scheduled communication at the second network entity is an uplink transmission.

In some examples, the set of multiple downlink control channel transmissions schedule the communications at the first network entity to be performed using a communication beam having a same quasi-colocation root reference signal as a beam for transmitting or receiving the scheduled communication.

In some examples, the downlink control channel transmission pattern includes a set of time and frequency resources for a set of multiple downlink control channel transmission repetitions.

Figure 8:
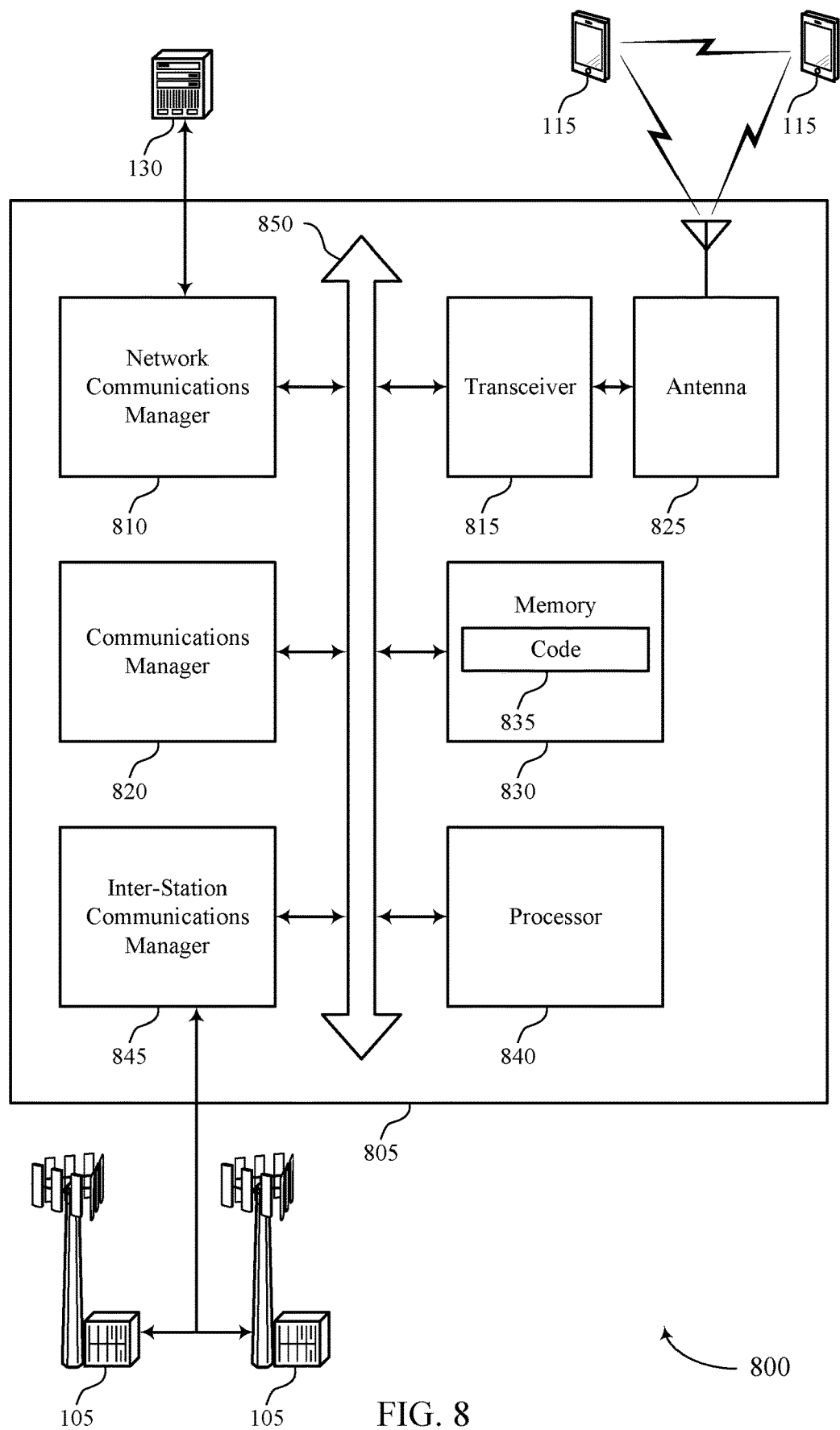
FIG. 8 shows a diagram of a system including a device that supports OTA signaling for inter-base station CLI measurements in accordance with aspects of the present disclosure.

FIG. 8 shows a diagram of a system 800 including a device 805 that supports OTA signaling for inter-base station CLI measurements in accordance with aspects of the present disclosure. The device 805 may be an example of or include the components of a device 505, a device 605, or a network entity, such as one or more components of a base station 105, as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random-access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting OTA signaling for inter-base station CLI measurements). For example, the device 805 or a component of the device 805 may include a processor 840 and memory 830 coupled with or to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communication in accordance with examples as disclosed herein. For example, the communications manager 820 may be configured as or otherwise support a means for receiving, from a first network entity, a broadcast indicating a downlink control channel transmission pattern associated with the first network entity. The communications manager 820 may be configured as or otherwise support a means for monitoring a set of multiple receive beams at a second network entity for a set of multiple downlink control channel transmissions from the first network entity according to the downlink control channel transmission pattern. The communications manager 820 may be configured as or otherwise support a means for selecting a communication beam according to one or more cross-link interference measurements associated with one or more of the set of multiple receive beams in accordance with the monitoring. The communications manager 820 may be configured as or otherwise support a means for communicating with a UE using the selected communication beam and a first set of resources that at least partially overlap in time and frequency with a scheduled communication at the first network entity.

Additionally or alternatively, the communications manager 820 may support wireless communication in accordance with examples as disclosed herein. For example, the communications manager 820 may be configured as or otherwise support a means for broadcasting, by a first network entity, an indication of a downlink control channel transmission pattern associating with the first network entity. The communications manager 820 may be configured as or otherwise support a means for transmitting a set of multiple downlink control channel transmissions using a set of multiple transmit beams according to the downlink control channel transmission pattern, where the set of multiple downlink control channel transmissions schedule resources for communications at the first network entity. The communications manager 820 may be configured as or otherwise support a means for communicating during the scheduled resources, where the scheduled resources at least partially overlap in time and frequency with a scheduled communication at a second network entity.

By including or configuring the communications manager 820 in accordance with examples as described herein, the device 805 may support techniques for improved communication reliability, reduced latency, improved user experience related to more efficient utilization of communication resources, and improved coordination between devices, among other examples.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of OTA signaling for inter-base station CLI measurements as described herein, or the processor 840 and the memory 830 may be otherwise configured to perform or support such operations.

Figure 9:
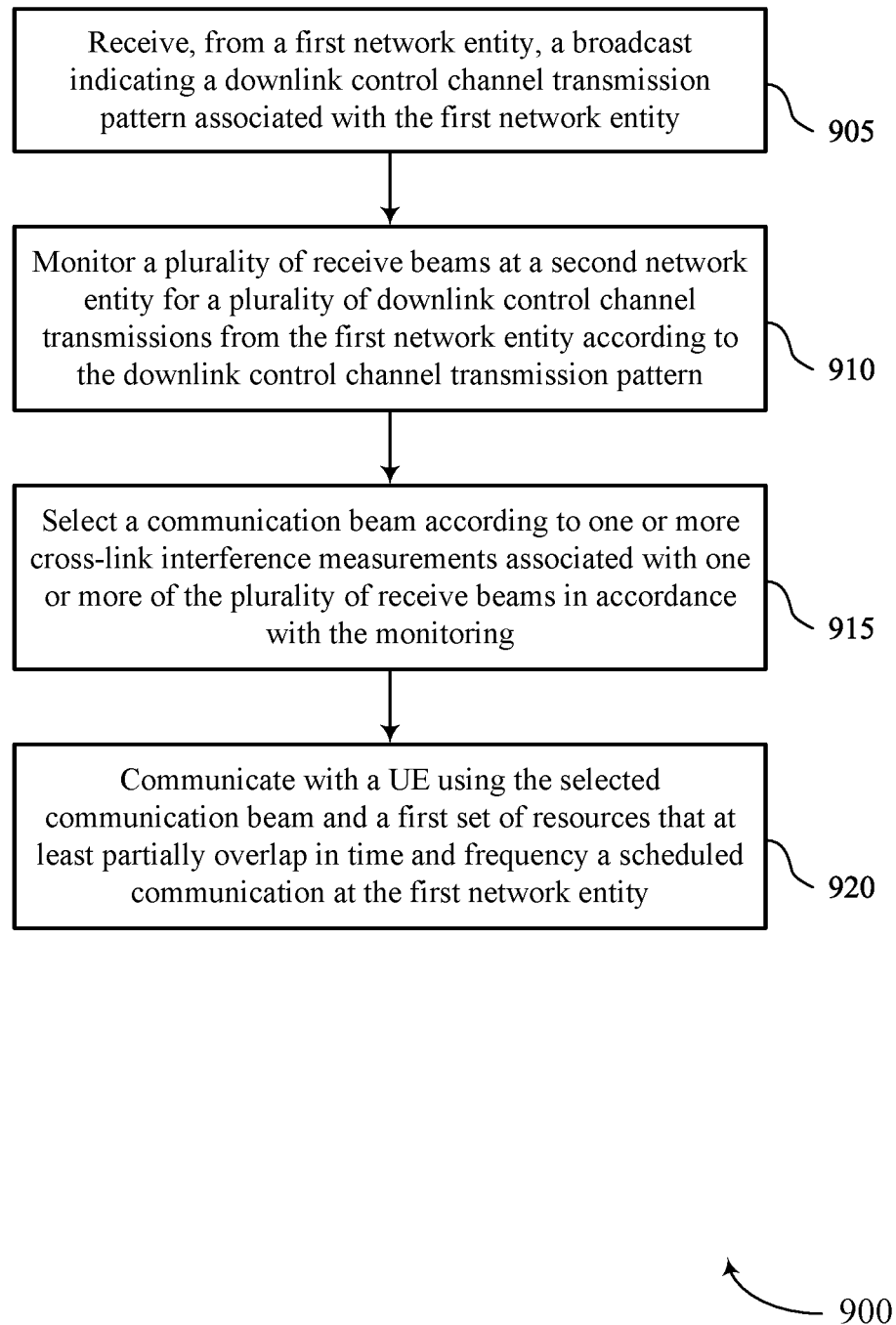
FIGS. 9 through 14 show flowcharts illustrating methods that support OTA signaling for inter-base station CLI measurements in accordance with aspects of the present disclosure.

FIG. 9 shows a flowchart illustrating a method 900 that supports OTA signaling for inter-base station CLI measurements in accordance with aspects of the present disclosure. The operations of the method 900 may be implemented by a base station or its components as described herein. For example, the operations of the method 900 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 905, the method may include receiving, from a first network entity, a broadcast indicating a downlink control channel transmission pattern associated with the first network entity. The operations of 905 may be performed in accordance with examples as disclosed herein. In some examples, aspects of the operations of 905 may be performed by a downlink control channel transmission pattern component 725 as described with reference to FIG. 7.

At 910, the method may include monitoring a set of multiple receive beams at a second network entity for a set of multiple downlink control channel transmissions from the first network entity according to the downlink control channel transmission pattern. The operations of 910 may be performed in accordance with examples as disclosed herein. In some examples, aspects of the operations of 910 may be performed by a monitoring component 730 as described with reference to FIG. 7.

At 915, the method may include selecting a communication beam according to one or more cross-link interference measurements associated with one or more of the set of multiple receive beams in accordance with the monitoring. The operations of 915 may be performed in accordance with examples as disclosed herein. In some examples, aspects of the operations of 915 may be performed by a beam selection component 735 as described with reference to FIG. 7.

At 920, the method may include communicating with a UE using the selected communication beam and a first set of resources that at least partially overlap in time and frequency with a scheduled communication at the first network entity. The operations of 920 may be performed in accordance with examples as disclosed herein. In some examples, aspects of the operations of 920 may be performed by a beam communication component 740 as described with reference to FIG. 7.

Figure 10:
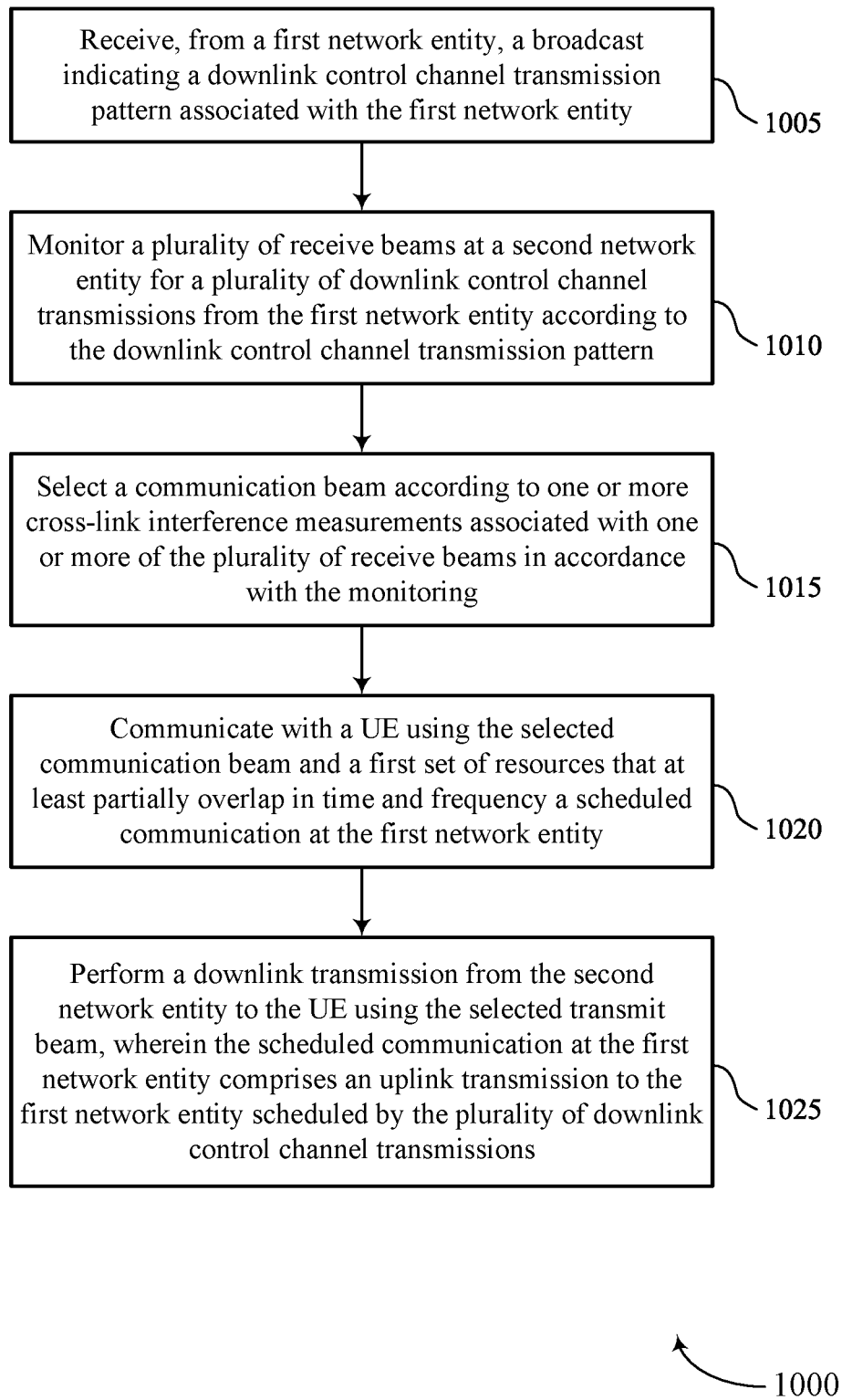

FIG. 10 shows a flowchart illustrating a method 1000 that supports OTA signaling for inter-base station CLI measurements in accordance with aspects of the present disclosure. The operations of the method 1000 may be implemented by a base station or its components as described herein. For example, the operations of the method 1000 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1005, the method may include receiving, from a first network entity, a broadcast indicating a downlink control channel transmission pattern associated with the first network entity. The operations of 1005 may be performed in accordance with examples as disclosed herein. In some examples, aspects of the operations of 1005 may be performed by a downlink control channel transmission pattern component 725 as described with reference to FIG. 7.

At 1010, the method may include monitoring a set of multiple receive beams at a second network entity for a set of multiple downlink control channel transmissions from the first network entity according to the downlink control channel transmission pattern. The operations of 1010 may be performed in accordance with examples as disclosed herein. In some examples, aspects of the operations of 1010 may be performed by a monitoring component 730 as described with reference to FIG. 7.

At 1015, the method may include selecting a communication beam according to one or more cross-link interference measurements associated with one or more of the set of multiple receive beams in accordance with the monitoring. The operations of 1015 may be performed in accordance with examples as disclosed herein. In some examples, aspects of the operations of 1015 may be performed by a beam selection component 735 as described with reference to FIG. 7.

At 1020, the method may include communicating with a UE using the selected communication beam and a first set of resources that at least partially overlap in time and frequency with a scheduled communication at the first network entity. The operations of 1020 may be performed in accordance with examples as disclosed herein. In some examples, aspects of the operations of 1020 may be performed by a beam communication component 740 as described with reference to FIG. 7.

At 1025, the method may include performing a downlink transmission from the second network entity to the UE using the selected transmit beam, where the scheduled communication at the first network entity includes an uplink transmission to the first network entity scheduled by the set of multiple downlink control channel transmissions. The operations of 1025 may be performed in accordance with examples as disclosed herein. In some examples, aspects of the operations of 1025 may be performed by a transmit beam communication component 760 as described with reference to FIG. 7.

Figure 11:
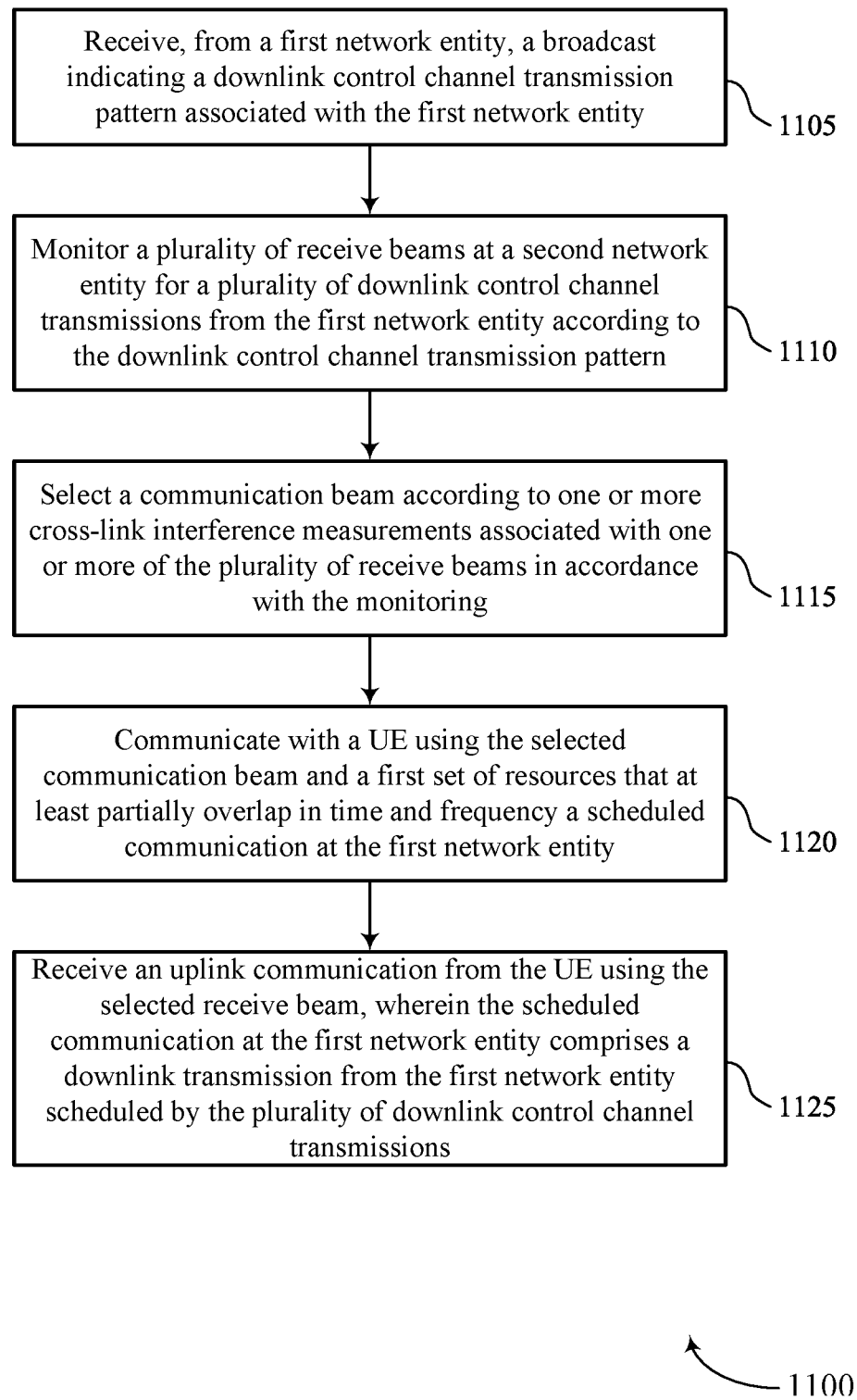

FIG. 11 shows a flowchart illustrating a method 1100 that supports OTA signaling for inter-base station CLI measurements in accordance with aspects of the present disclosure. The operations of the method 1100 may be implemented by a base station or its components as described herein. For example, the operations of the method 1100 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1105, the method may include receiving, from a first network entity, a broadcast indicating a downlink control channel transmission pattern associated with the first network entity. The operations of 1105 may be performed in accordance with examples as disclosed herein. In some examples, aspects of the operations of 1105 may be performed by a downlink control channel transmission pattern component 725 as described with reference to FIG. 7.

At 1110, the method may include monitoring a set of multiple receive beams at a second network entity for a set of multiple downlink control channel transmissions from the first network entity according to the downlink control channel transmission pattern. The operations of 1110 may be performed in accordance with examples as disclosed herein. In some examples, aspects of the operations of 1110 may be performed by a monitoring component 730 as described with reference to FIG. 7.

At 1115, the method may include selecting a communication beam according to one or more cross-link interference measurements associated with one or more of the set of multiple receive beams in accordance with the monitoring. The operations of 1115 may be performed in accordance with examples as disclosed herein. In some examples, aspects of the operations of 1115 may be performed by a beam selection component 735 as described with reference to FIG. 7.

At 1120, the method may include communicating with a UE using the selected communication beam and a first set of resources that at least partially overlap in time and frequency with a scheduled communication at the first network entity. The operations of 1120 may be performed in accordance with examples as disclosed herein. In some examples, aspects of the operations of 1120 may be performed by a beam communication component 740 as described with reference to FIG. 7.

At 1125, the method may include receiving an uplink communication from the UE using the selected receive beam, where the scheduled communication at the first network entity includes a downlink transmission from the first network entity scheduled by the set of multiple downlink control channel transmissions. The operations of 1125 may be performed in accordance with examples as disclosed herein. In some examples, aspects of the operations of 1125 may be performed by a receive beam communication component 765 as described with reference to FIG. 7.

Figure 12:
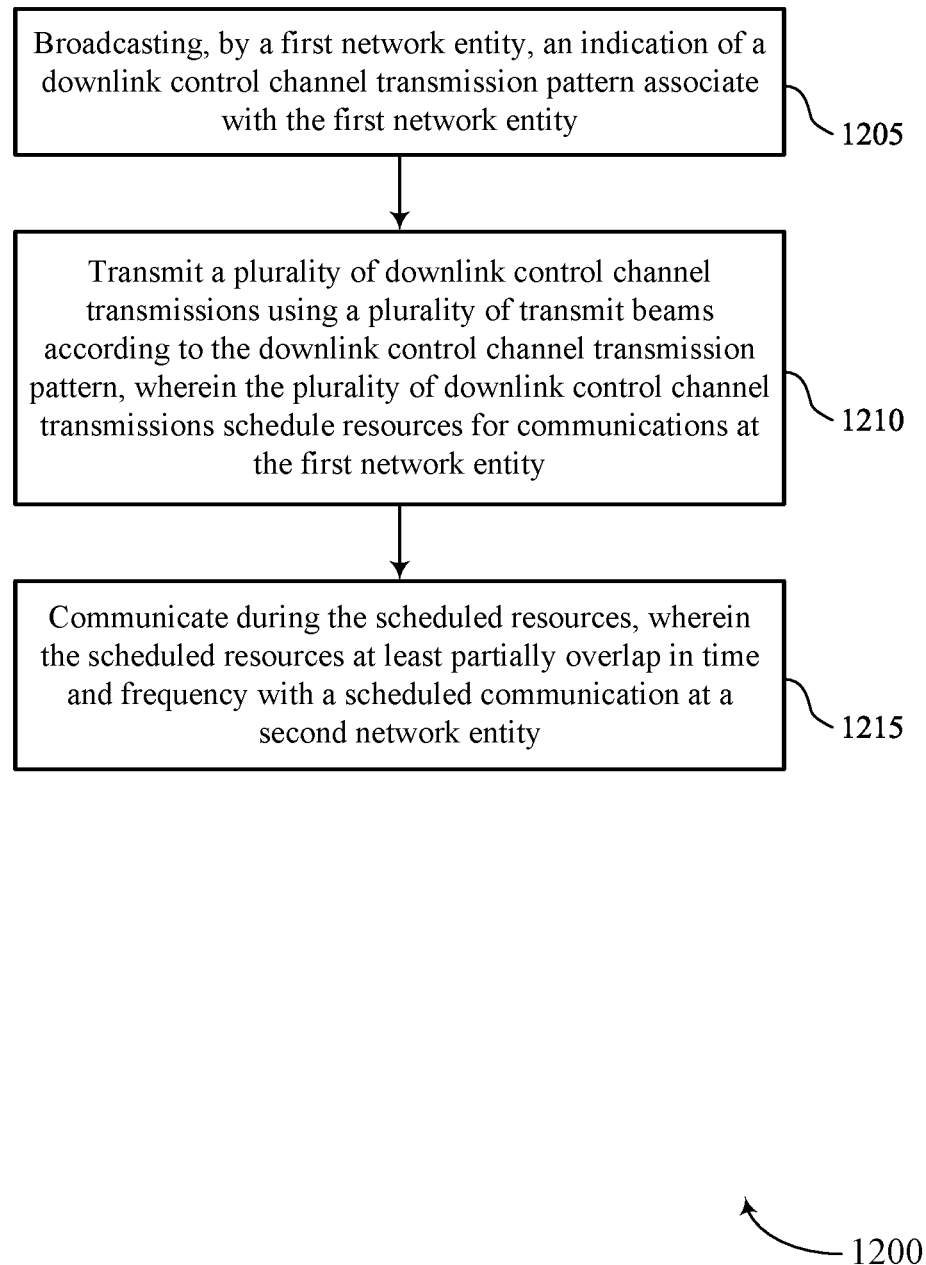

FIG. 12 shows a flowchart illustrating a method 1200 that supports OTA signaling for inter-base station CLI measurements in accordance with aspects of the present disclosure. The operations of the method 1200 may be implemented by a base station or its components as described herein. For example, the operations of the method 1200 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1205, the method may include broadcasting, by a first network entity, an indication of a downlink control channel transmission pattern associated with the first network entity. The operations of 1205 may be performed in accordance with examples as disclosed herein. In some examples, aspects of the operations of 1205 may be performed by a downlink control channel transmission pattern broadcast component 745 as described with reference to FIG. 7.

At 1210, the method may include transmitting a set of multiple downlink control channel transmissions using a set of multiple transmit beams according to the downlink control channel transmission pattern, where the set of multiple downlink control channel transmissions schedule resources for communications at the first network entity. The operations of 1210 may be performed in accordance with examples as disclosed herein. In some examples, aspects of the operations of 1210 may be performed by a downlink control channel transmission pattern transmission component 750 as described with reference to FIG. 7.

At 1215, the method may include communicating during the scheduled resources, where the scheduled resources at least partially overlap in time and frequency with a scheduled communication at a second network entity. The operations of 1215 may be performed in accordance with examples as disclosed herein. In some examples, aspects of the operations of 1215 may be performed by a scheduled communications component 755 as described with reference to FIG. 7.

Figure 13:
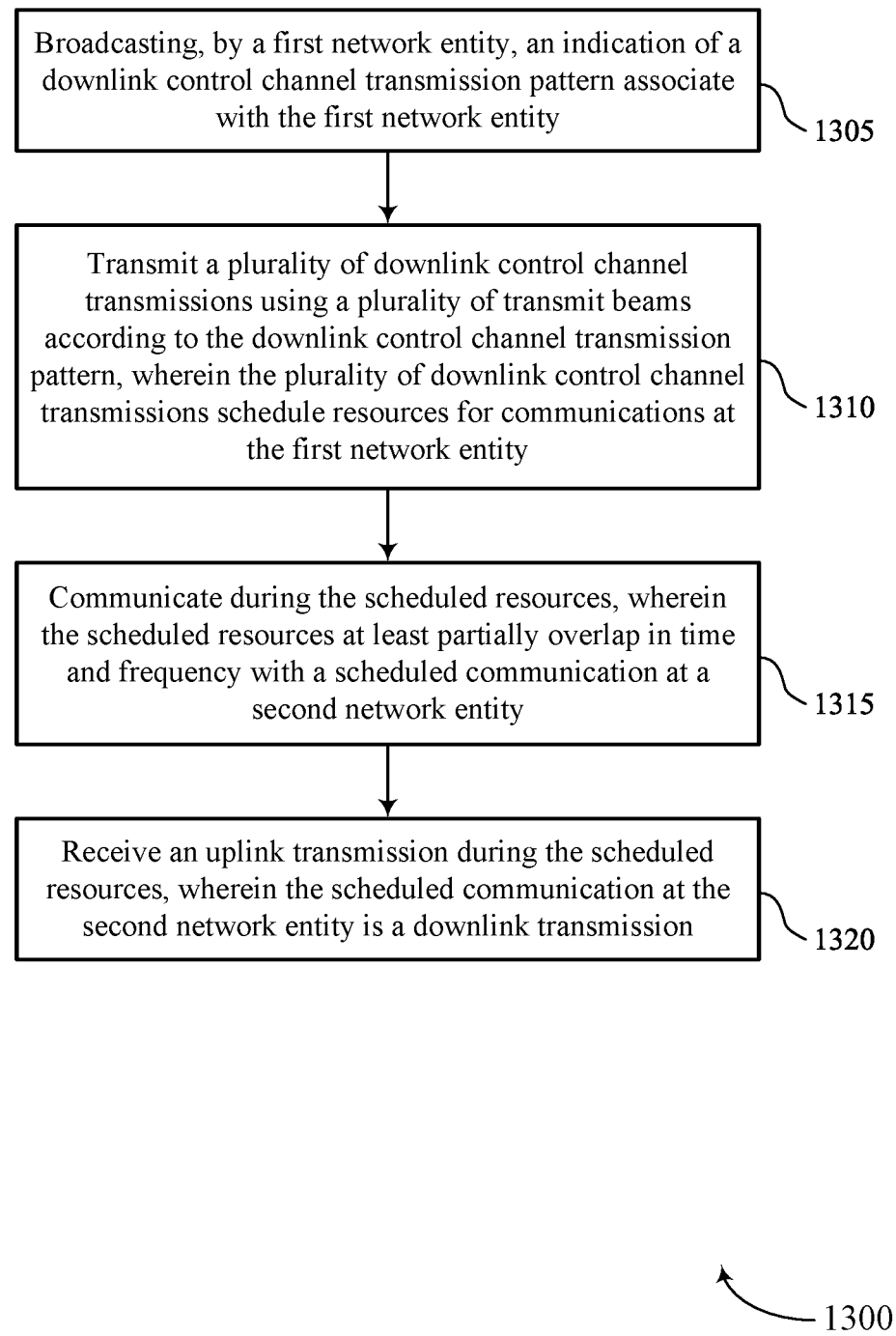

FIG. 13 shows a flowchart illustrating a method 1300 that supports OTA signaling for inter-base station CLI measurements in accordance with aspects of the present disclosure. The operations of the method 1300 may be implemented by a base station or its components as described herein. For example, the operations of the method 1300 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1305, the method may include broadcasting, by a first network entity, an indication of a downlink control channel transmission pattern associated with the first network entity. The operations of 1305 may be performed in accordance with examples as disclosed herein. In some examples, aspects of the operations of 1305 may be performed by a downlink control channel transmission pattern broadcast component 745 as described with reference to FIG. 7.

At 1310, the method may include transmitting a set of multiple downlink control channel transmissions using a set of multiple transmit beams according to the downlink control channel transmission pattern, where the set of multiple downlink control channel transmissions schedule resources for communications at the first network entity. The operations of 1310 may be performed in accordance with examples as disclosed herein. In some examples, aspects of the operations of 1310 may be performed by a downlink control channel transmission pattern transmission component 750 as described with reference to FIG. 7.

At 1315, the method may include communicating during the scheduled resources, where the scheduled resources at least partially overlap in time and frequency with a scheduled communication at a second network entity. The operations of 1315 may be performed in accordance with examples as disclosed herein. In some examples, aspects of the operations of 1315 may be performed by a scheduled communications component 755 as described with reference to FIG. 7.

At 1320, the method may include receiving an uplink transmission during the scheduled resources, where the scheduled communication at the second network entity is a downlink transmission. The operations of 1320 may be performed in accordance with examples as disclosed herein. In some examples, aspects of the operations of 1320 may be performed by a scheduled communications component 755 as described with reference to FIG. 7.

Figure 14:
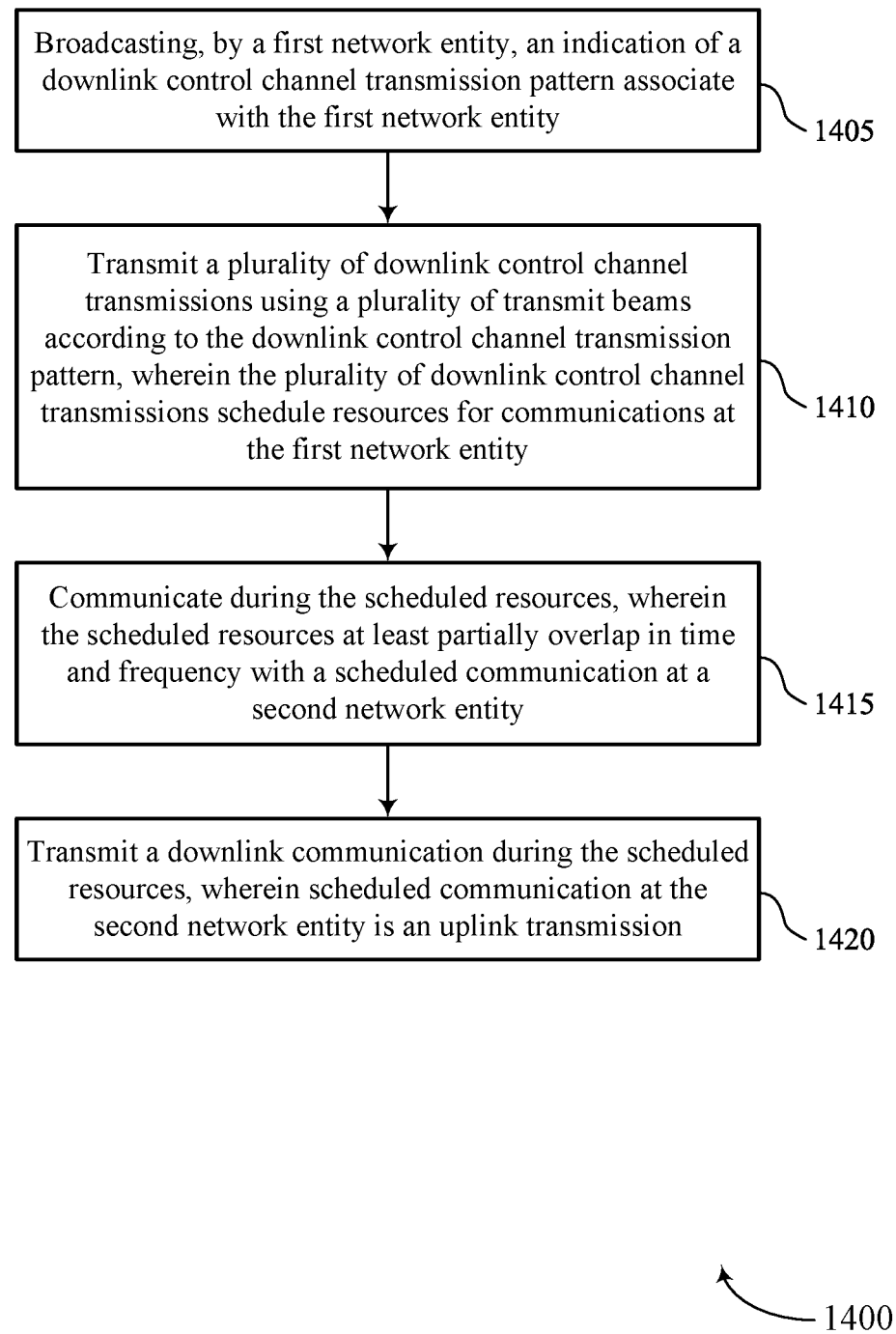

FIG. 14 shows a flowchart illustrating a method 1400 that supports OTA signaling for inter-base station CLI measurements in accordance with aspects of the present disclosure. The operations of the method 1400 may be implemented by a base station or its components as described herein. For example, the operations of the method 1400 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1405, the method may include broadcasting, by a first network entity, an indication of a downlink control channel transmission pattern associated with the first network entity. The operations of 1405 may be performed in accordance with examples as disclosed herein. In some examples, aspects of the operations of 1405 may be performed by a downlink control channel transmission pattern broadcast component 745 as described with reference to FIG. 7.

At 1410, the method may include transmitting a set of multiple downlink control channel transmissions using a set of multiple transmit beams according to the downlink control channel transmission pattern, where the set of multiple downlink control channel transmissions schedule resources for communications at the first network entity. The operations of 1410 may be performed in accordance with examples as disclosed herein. In some examples, aspects of the operations of 1410 may be performed by a downlink control channel transmission pattern transmission component 750 as described with reference to FIG. 7.

At 1415, the method may include communicating during the scheduled resources, where the scheduled resources at least partially overlap in time and frequency with a scheduled communication at a second network entity. The operations of 1415 may be performed in accordance with examples as disclosed herein. In some examples, aspects of the operations of 1415 may be performed by a scheduled communications component 755 as described with reference to FIG. 7.

At 1420, the method may include transmitting a downlink communication during the scheduled resources, where scheduled communication at the second network entity is an uplink transmission. The operations of 1420 may be performed in accordance with examples as disclosed herein. In some examples, aspects of the operations of 1420 may be performed by a scheduled communications component 755 as described with reference to FIG. 7.

The following provides an overview of aspects of the present disclosure:

Aspect 1: A method for wireless communication, comprising: receiving, from a first network entity, a broadcast indicating a downlink control channel transmission pattern associated with the first network entity; monitoring a plurality of receive beams at a second network entity for a plurality of downlink control channel transmissions from the first network entity according to the downlink control channel transmission pattern; selecting a communication beam according to one or more cross-link interference measurements associated with one or more of the plurality of receive beams in accordance with the monitoring; and communicating with a UE using the selected communication beam and a first set of resources that at least partially overlap in time and frequency with a scheduled communication at the first network entity.

Aspect 2: The method of aspect 1, wherein the communication beam comprises a transmit beam and communicating with the UE comprises: performing a downlink transmission from the second network entity to the UE using the selected transmit beam, wherein the scheduled communication at the first network entity comprises an uplink transmission to the first network entity scheduled by the plurality of downlink control channel transmissions.

Aspect 3: The method of any of aspects 1 through 2, wherein the communication beam comprises a receive beam and communicating with the UE comprises: receiving an uplink communication from the UE using the selected receive beam, wherein the scheduled communication at the first network entity comprises a downlink transmission from the first network entity scheduled by the plurality of downlink control channel transmissions.

Aspect 4: The method of any of aspects 1 through 3, further comprising: receiving, using a first receive beam of the plurality of receive beams, at least one downlink control channel transmission of the plurality of downlink control channel transmissions associated with a transmit beam of the first network entity based at least in part on the monitoring; and measuring a cross-link interference level associated with the at least one downlink control channel transmission as one of the one or more cross-link interference measurements, wherein selecting the transmit beam is based at least in part on the measuring Aspect 5: The method of any of aspects 1 through 4, wherein selecting the communication beam comprises: selecting a transmit beam associated with a lowest cross-link interference level of the one or more cross-link interference measurements; or selecting a transmit beam associated with a cross-link interference level of the one or more cross-link interference measurements that is smaller than a threshold cross-link interference level.

Aspect 6: The method of any of aspects 1 through 5, wherein selecting the communication beam comprises: selecting a transmit beam associated with a cross-link interference level of the one or more cross-link interference measurements that is higher than a first threshold, wherein the communicating with the UE comprises: transmitting, using the selected transmit beam, a downlink transmission using a reduced transmission power based at least in part on the cross-link interference level associated with the selected transmit beam being higher than the first threshold.

Aspect 7: The method of any of aspects 1 through 6, wherein selecting the communication beam comprises: selecting a receive beam associated with a lowest cross-link interference level of the one or more cross-link interference measurements; or selecting a receive beam associated with a cross-link interference level of the one or more cross-link interference measurements that is smaller than a threshold cross-link interference level.

Aspect 8: The method of any of aspects 1 through 7, wherein selecting the communication beam comprises: selecting a receive beam associated with a cross-link interference level of the one or more cross-link interference measurements that is higher than a threshold; and transmitting signaling indicating a power increase to the UE, wherein the communicating with the UE comprises: receiving, using the selected receive beam from the UE, an uplink transmission based at least in part on the power increase.

Aspect 9: The method of any of aspects 1 through 8, wherein the downlink control channel transmission pattern comprises a set of time and frequency resources for a plurality of downlink control channel transmission repetitions.

Aspect 10: The method of any of aspects 1 through 9, wherein the one or more cross-link interference measurements comprise one or more reference signal receive power measurements for each receive beam of the plurality of receive beams.

Aspect 11: The method of any of aspects 1 through 10, wherein the plurality of receive beams are downlink beams.

Aspect 12: The method of any of aspects 1 through 11, wherein the plurality of receive beams are uplink beams.

Aspect 13: A method for wireless communication, comprising: broadcasting, by a first network entity, an indication of a downlink control channel transmission pattern associated with the first network entity; transmitting a plurality of downlink control channel transmissions using a plurality of transmit beams according to the downlink control channel transmission pattern, wherein the plurality of downlink control channel transmissions schedule resources for communications at the first network entity; and communicating during the scheduled resources, wherein the scheduled resources at least partially overlap in time and frequency with a scheduled communication at a second network entity.

Aspect 14: The method of aspect 13, wherein the scheduled resources for communications at the first network entity comprise resources for an uplink transmission to the first network entity.

Aspect 15: The method of aspect 14, wherein communicating during the scheduled resources comprises: receiving the uplink transmission during the scheduled resources, wherein the scheduled communication at the second network entity is a downlink transmission.

Aspect 16: The method of any of aspects 13 through 15, wherein the scheduled resources for communications at the first network entity comprise resources for a downlink communication by the first network entity.

Aspect 17: The method of aspect 16, wherein communicating during the scheduled resources comprises: transmitting the downlink communication during the scheduled resources, wherein scheduled communication at the second network entity is an uplink transmission.

Aspect 18: The method of any of aspects 13 through 17, wherein the plurality of downlink control channel transmissions schedule the communications at the first network entity to be performed using a communication beam having a same quasi-colocation root reference signal as a beam for transmitting or receiving the scheduled communication.

Aspect 19: The method of any of aspects 13 through 18, wherein the downlink control channel transmission pattern comprises a set of time and frequency resources for a plurality of downlink control channel transmission repetitions.

Aspect 20: An apparatus for wireless communication, comprising at least one processor; memory coupled with the at least one processor, the memory storing instructions executable by the processor to cause the apparatus to perform a method of any of aspects 1 through 12.

Aspect 21: An apparatus for wireless communication, comprising at least one means for performing a method of any of aspects 1 through 12.

Aspect 22: A non-transitory computer-readable medium storing code for wireless communication, the code comprising instructions executable by at least one processor to perform a method of any of aspects 1 through 12.

Aspect 23: An apparatus for wireless communication, comprising at least one processor; memory coupled with the at least one processor, the memory storing instructions executable by the processor to cause the apparatus to perform a method of any of aspects 13 through 19.

Aspect 24: An apparatus for wireless communication, comprising at least one means for performing a method of any of aspects 13 through 19.

Aspect 25: A non-transitory computer-readable medium storing code for wireless communication, the code comprising instructions executable by at least one processor to perform a method of any of aspects 13 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication, comprising:
   at least one processor; and
   memory coupled with the at least one processor, the memory storing instructions executable by the at least one processor to cause the apparatus to:
   receive, from a first network entity, a broadcast indicating a downlink control channel transmission pattern associated with the first network entity;
   monitor a plurality of receive beams at a second network entity for a plurality of downlink control channel transmissions from the first network entity according to the downlink control channel transmission pattern;
   select a communication beam according to one or more cross-link interference measurements associated with one or more of the plurality of receive beams in accordance with the monitoring; and
   communicate with a user equipment (UE) using the selected communication beam and a first set of resources that at least partially overlap in time and frequency with a scheduled communication at the first network entity.

2. The apparatus of claim 1, wherein the communication beam comprises a transmit beam and the instructions executable by the at least one processor to cause the apparatus to communicate with the UE are executable by the at least one processor to cause the apparatus to:
   perform a downlink transmission from the second network entity to the UE using the selected transmit beam, wherein the scheduled communication at the first network entity comprises an uplink transmission to the first network entity scheduled by the plurality of downlink control channel transmissions.

3. The apparatus of claim 1, wherein the communication beam comprises a receive beam and the instructions executable by the at least one processor to cause the apparatus to communicate with the UE are executable by the at least one processor to cause the apparatus to:
   receive an uplink communication from the UE using the selected receive beam, wherein the scheduled communication at the first network entity comprises a downlink transmission from the first network entity scheduled by the plurality of downlink control channel transmissions.

4. The apparatus of claim 1, wherein the instructions are further executable by the processor to cause the apparatus to:
   receive, using a first receive beam of the plurality of receive beams, at least one downlink control channel transmission of the plurality of downlink control channel transmissions associated with a transmit beam of the first network entity based at least in part on the monitoring; and
   measure a cross-link interference level associated with the at least one downlink control channel transmission as one of the one or more cross-link interference measurements, wherein selecting the transmit beam is based at least in part on the measuring.

5. The apparatus of claim 1, wherein the instructions to select the communication beam are executable by the processor to cause the apparatus to:
   select a transmit beam associated with a lowest cross-link interference level of the one or more cross-link interference measurements; or
   select a transmit beam associated with a cross-link interference level of the one or more cross-link interference measurements that is smaller than a threshold cross-link interference level.

6. The apparatus of claim 1, wherein the instructions to select the communication beam are executable by the processor to cause the apparatus to:
   select a transmit beam associated with a cross-link interference level of the one or more cross-link interference measurements that is higher than a first threshold, wherein the communicating with the UE comprises:
transmit, using the selected transmit beam, a downlink transmission using a reduced transmission power based at least in part on the cross-link interference level associated with the selected transmit beam being higher than the first threshold.

7. The apparatus of claim 1, wherein the instructions to select the communication beam are executable by the processor to cause the apparatus to:
select a receive beam associated with a lowest cross-link interference level of the one or more cross-link interference measurements; or
select a receive beam associated with a cross-link interference level of the one or more cross-link interference measurements that is smaller than a threshold cross-link interference level.

8. The apparatus of claim 1, wherein the instructions to select the communication beam are executable by the processor to cause the apparatus to:
select a receive beam associated with a cross-link interference level of the one or more cross-link interference measurements that is higher than a threshold;
and transmit signaling indicating a power increase to the UE, wherein the communicating with the UE comprises:
receive, using the selected receive beam from the UE, an uplink transmission based at least in part on the power increase.

9. The apparatus of claim 1, wherein the downlink control channel transmission pattern comprises a set of time and frequency resources for a plurality of downlink control channel transmission repetitions.

10. The apparatus of claim 1, wherein the one or more cross-link interference measurements comprise one or more reference signal receive power measurements for each receive beam of the plurality of receive beams.

11. The apparatus of claim 1, wherein:
the plurality of receive beams are downlink beams.

12. The apparatus of claim 1, wherein:
the plurality of receive beams are uplink beams.

13. A method for wireless communication, comprising:
receiving, from a first network entity, a broadcast indicating a downlink control channel transmission pattern associated with the first network entity;
monitoring a plurality of receive beams at a second network entity for a plurality of downlink control channel transmissions from the first network entity according to the downlink control channel transmission pattern;
selecting a communication beam according to one or more cross-link interference measurements associated with one or more of the plurality of receive beams in accordance with the monitoring; and
communicating with a user equipment (UE) using the selected communication beam and a first set of resources that at least partially overlap in time and frequency with a scheduled communication at the first network entity.

14. The method of claim 13, wherein the communication beam comprises a transmit beam and communicating with the UE comprises:
performing a downlink transmission from the second network entity to the UE using the selected transmit beam, wherein the scheduled communication at the first network entity comprises an uplink transmission to the first network entity scheduled by the plurality of downlink control channel transmissions.

15. The method of claim 13, wherein the communication beam comprises a receive beam and communicating with the UE comprises:
receiving an uplink communication from the UE using the selected receive beam, wherein the scheduled communication at the first network entity comprises a downlink transmission from the first network entity scheduled by the plurality of downlink control channel transmissions.

16. The method of claim 13, further comprising:
receiving, using a first receive beam of the plurality of receive beams, at least one downlink control channel transmission of the plurality of downlink control channel transmissions associated with a transmit beam of the first network entity based at least in part on the monitoring; and
measuring a cross-link interference level associated with the at least one downlink control channel transmission as one of the one or more cross-link interference measurements, wherein selecting the transmit beam is based at least in part on the measuring.

17. The method of claim 13, wherein selecting the communication beam comprises:
selecting a transmit beam associated with a lowest cross-link interference level of the one or more cross-link interference measurements; or
selecting a transmit beam associated with a cross-link interference level of the one or more cross-link interference measurements that is smaller than a threshold cross-link interference level.

18. The method of claim 13, wherein selecting the communication beam comprises:
selecting a transmit beam associated with a cross-link interference level of the one or more cross-link interference measurements that is higher than a first threshold, wherein the communicating with the UE comprises:
transmitting, using the selected transmit beam, a downlink transmission using a reduced transmission power based at least in part on the cross-link interference level associated with the selected transmit beam being higher than the first threshold.

19. The method of claim 13, wherein selecting the communication beam comprises:
selecting a receive beam associated with a lowest cross-link interference level of the one or more cross-link interference measurements; or
selecting a receive beam associated with a cross-link interference level of the one or more cross-link interference measurements that is smaller than a threshold cross-link interference level.

20. The method of claim 13, wherein selecting the communication beam comprises:
selecting a receive beam associated with a cross-link interference level of the one or more cross-link interference measurements that is higher than a threshold;
and transmitting signaling indicating a power increase to the UE, wherein the communicating with the UE comprises:
receiving, using the selected receive beam from the UE, an uplink transmission based at least in part on the power increase.

21. The method of claim 13, wherein the downlink control channel transmission pattern comprises a set of time and frequency resources for a plurality of downlink control channel transmission repetitions.

22. The method of claim 13, wherein the one or more cross-link interference measurements comprise one or more reference signal receive power measurements for each receive beam of the plurality of receive beams.

23. The method of claim 13, wherein:
the plurality of receive beams are downlink beams.

24. The method of claim 13, wherein:
the plurality of receive beams are uplink beams.

* * * * *